United States Patent
Suciu et al.

(10) Patent No.: US 10,451,004 B2
(45) Date of Patent: Oct. 22, 2019

(54) GAS TURBINE ENGINE WITH LOW STAGE COUNT LOW PRESSURE TURBINE

(71) Applicant: UNITED TECHNOLOGIES CORPORATION, Farmington, CT (US)

(72) Inventors: Gabriel L. Suciu, Glastonbury, CT (US); Brian D. Merry, Andover, CT (US); Christopher M. Dye, San Diego, CA (US); Steven B. Johnson, Marlborough, CT (US); Frederick M. Schwarz, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/173,288

(22) Filed: Jun. 3, 2016

(65) Prior Publication Data

US 2017/0058830 A1    Mar. 2, 2017

Related U.S. Application Data

(63) Continuation of application No. 14/755,221, filed on Jun. 30, 2015, now abandoned, which is a
(Continued)

(51) Int. Cl.
*F01D 5/06* (2006.01)
*F02C 7/20* (2006.01)
(Continued)

(52) U.S. Cl.
CPC .............. *F02K 3/06* (2013.01); *B64D 27/26* (2013.01); *F01D 5/06* (2013.01); *F01D 9/02* (2013.01);
(Continued)

(58) Field of Classification Search
CPC ....... F02K 1/09; F02K 3/06; B64D 2027/262; B64D 2027/264; B64D 2027/266;
(Continued)

(56) References Cited

U.S. PATENT DOCUMENTS 2,258,792 A   10/1941   New
2,608,821 A    9/1952   Hunsaker
(Continued)

FOREIGN PATENT DOCUMENTS

EP     0791383     8/1997
EP     1142850    10/2001
(Continued)

OTHER PUBLICATIONS

Wendus, et al., "Follow-On Technology Requirement Study for Advanced Subsonic Transport", NASA/CR-2003-212467, Aug. 2003.*
(Continued)

*Primary Examiner* — Alain Chau
(74) *Attorney, Agent, or Firm* — Carlson, Gaskey & Olds, P.C.

(57) ABSTRACT

A gas turbine engine includes, among other things, a fan section including a fan rotor, a gear train defined about an engine axis of rotation, a first nacelle which at least partially surrounds a second nacelle and the fan rotor, the fan section configured to communicate airflow into the first nacelle and the second nacelle, a first turbine, and a second turbine followed by the first turbine. The first turbine is configured to drive the fan rotor through the gear train. A static structure includes a first engine mount location and a second engine mount location.

25 Claims, 11 Drawing Sheets

Related U.S. Application Data continuation of application No. 14/190,429, filed on Feb. 26, 2014, now abandoned, which is a continuation-in-part of application No. 13/340,988, filed on Dec. 30, 2011, now Pat. No. 8,800,914, which is a continuation-in-part of application No. 12/131,876, filed on Jun. 2, 2008, now Pat. No. 8,128,021.

(51) Int. Cl.

| | | |
|---|---|---|
| *F02C 7/36* | (2006.01) | |
| *F02K 3/06* | (2006.01) | |
| *B64D 27/26* | (2006.01) | |
| *F01D 15/12* | (2006.01) | |
| *F01D 25/24* | (2006.01) | |
| *F01D 25/28* | (2006.01) | |
| *F02C 3/107* | (2006.01) | |
| *F02C 9/20* | (2006.01) | |
| *F02C 9/18* | (2006.01) | |
| *F01D 9/02* | (2006.01) | |
| *F02K 1/15* | (2006.01) | |

(52) U.S. Cl.
CPC ............ *F01D 15/12* (2013.01); *F01D 25/24* (2013.01); *F01D 25/28* (2013.01); *F02C 3/107* (2013.01); *F02C 7/20* (2013.01); *F02C 7/36* (2013.01); *F02C 9/18* (2013.01); *F02C 9/20* (2013.01); *F02K 1/15* (2013.01); *B64D 2027/266* (2013.01); *B64D 2027/268* (2013.01); *F05D 2220/32* (2013.01); *F05D 2220/36* (2013.01); *F05D 2260/4031* (2013.01); *F05D 2260/40311* (2013.01); *F05D 2270/42* (2013.01)

(58) Field of Classification Search
CPC ... B64D 2027/268; B64D 27/26; F01D 25/16; F01D 25/162; F01D 25/28; F01D 25/25; F02C 3/107; F02C 7/20; F02C 7/36; F02C 9/18; F05D 2220/32; F05D 2220/36; F05D 2260/4031; F05D 2260/40311; F05D 2270/42
See application file for complete search history.

(56) References Cited

U.S. PATENT DOCUMENTS

| | | | |
|---|---|---|---|
| 2,748,623 A | 6/1956 | Hill | |
| 2,936,655 A | 5/1960 | Peterson | |
| 3,021,731 A | 2/1962 | Stoeckicht | |
| 3,033,002 A | 5/1962 | Davis | |
| 3,111,005 A | 11/1963 | Howell et al. | |
| 3,185,857 A | 5/1965 | Johnson | |
| 3,194,487 A | 7/1965 | Tyler | |
| 3,287,906 A | 11/1966 | McCormick | |
| 3,352,178 A | 11/1967 | Lindgren | |
| 3,363,419 A | 1/1968 | Wilde | |
| 3,412,560 A | 11/1968 | Gaubatz | |
| 3,468,473 A | 9/1969 | Davies et al. | |
| 3,526,092 A | 9/1970 | Steel | |
| 3,729,957 A | 5/1973 | Petrie et al. | |
| 3,747,343 A | 7/1973 | Rosen | |
| 3,754,484 A | 8/1973 | Roberts | |
| 3,779,010 A * | 12/1973 | Chamay | F02K 1/09 |
| | | | 239/265.31 |
| 3,820,719 A | 6/1974 | Clark | |
| 3,861,139 A | 1/1975 | Jones | |
| 3,886,737 A | 6/1975 | Grieb | |
| 3,892,358 A | 7/1975 | Gisslen | |
| 3,932,058 A | 1/1976 | Harner et al. | |
| 3,935,558 A | 1/1976 | Miller et al. | |
| 3,988,889 A | 11/1976 | Chamay et al. | |
| 4,118,927 A | 10/1978 | Kronogard | |
| 4,130,872 A | 12/1978 | Harloff | |
| 4,136,286 A | 1/1979 | O'Halloran et al. | |
| 4,137,708 A * | 2/1979 | Aspinwall | F02K 7/16 |
| | | | 60/204 |
| 4,233,555 A | 11/1980 | Roche | |
| 4,284,174 A | 8/1981 | Salvana et al. | |
| 4,405,892 A | 9/1983 | Staerzl | |
| 4,452,567 A | 6/1984 | Treby et al. | |
| 4,463,553 A | 8/1984 | Boudigues | |
| 4,478,551 A | 10/1984 | Honeycutt, Jr. et al. | |
| 4,649,114 A | 3/1987 | Miltenburger et al. | |
| 4,660,376 A | 4/1987 | Johnson | |
| 4,696,156 A | 9/1987 | Burr et al. | |
| 4,704,862 A * | 11/1987 | Dennison | F01D 7/00 |
| | | | 416/162 |
| 4,808,076 A | 2/1989 | Jarmon et al. | |
| 4,809,498 A | 3/1989 | Giffin, III et al. | |
| 4,827,712 A | 5/1989 | Coplin | |
| 4,879,624 A | 11/1989 | Jones et al. | |
| 4,885,912 A | 12/1989 | Nakhamkin | |
| 4,966,338 A | 10/1990 | Gordon | |
| 4,979,362 A | 12/1990 | Vershure, Jr. | |
| 5,074,109 A | 12/1991 | Mandet et al. | |
| 5,079,916 A | 1/1992 | Johnson | |
| 5,081,832 A | 1/1992 | Mowill | |
| 5,102,379 A | 4/1992 | Pagluica et al. | |
| 5,136,839 A | 8/1992 | Armstrong | |
| 5,141,400 A | 8/1992 | Murphy et al. | |
| 5,168,208 A | 12/1992 | Schultz et al. | |
| 5,174,525 A * | 12/1992 | Schilling | F02C 7/20 |
| | | | 244/54 |
| 5,182,464 A | 1/1993 | Woodworth et al. | |
| 5,252,905 A | 10/1993 | Wills et al. | |
| 5,273,393 A | 12/1993 | Jones et al. | |
| 5,275,357 A | 1/1994 | Seelan et al. | |
| 5,277,382 A | 1/1994 | Seelan et al. | |
| 5,307,622 A | 5/1994 | Ciokajlo et al. | |
| 5,317,877 A | 6/1994 | Stuart | |
| 5,320,307 A | 6/1994 | Spofford et al. | |
| 5,372,338 A | 12/1994 | Carlin | |
| 5,388,964 A | 2/1995 | Ciokajlo et al. | |
| 5,390,068 A | 2/1995 | Schultz et al. | |
| 5,409,184 A | 4/1995 | Udall et al. | |
| 5,433,674 A | 7/1995 | Sheridan et al. | |
| 5,443,229 A | 8/1995 | O'Brien et al. | |
| 5,447,411 A | 9/1995 | Curley et al. | |
| 5,452,575 A | 9/1995 | Freid | |
| 5,466,198 A | 11/1995 | McKibbin et al. | |
| 5,474,258 A | 12/1995 | Taylor et al. | |
| 5,497,961 A | 3/1996 | Newton | |
| 5,524,847 A | 6/1996 | Brodell et al. | |
| 5,594,665 A * | 1/1997 | Walter | F04D 27/001 |
| | | | 415/26 |
| 5,677,060 A | 10/1997 | Terentieva et al. | |
| 5,694,027 A | 12/1997 | Satake et al. | |
| 5,694,765 A | 12/1997 | Hield et al. | |
| 5,729,059 A | 3/1998 | Kilroy et al. | |
| 5,734,555 A | 3/1998 | Thompson et al. | |
| 5,740,668 A | 4/1998 | Fujiwara et al. | |
| 5,746,391 A | 5/1998 | Rodgers et al. | |
| 5,754,033 A | 5/1998 | Thomson | |
| 5,778,659 A | 7/1998 | Duesler et al. | |
| 5,791,789 A | 8/1998 | Van Duyn et al. | |
| 5,806,303 A | 9/1998 | Johnson | |
| 5,810,287 A | 9/1998 | O'Boyle et al. | |
| 5,857,836 A | 1/1999 | Stickler et al. | |
| 5,860,276 A * | 1/1999 | Newton | F02C 7/20 |
| | | | 60/226.1 |
| 5,871,175 A | 2/1999 | Demouzon et al. | |
| 5,871,176 A | 2/1999 | Demouzon et al. | |
| 5,871,177 A | 2/1999 | Demouzon et al. | |
| 5,886,890 A | 3/1999 | Ishida et al. | |
| 5,915,917 A | 6/1999 | Eveker et al. | |
| 5,921,500 A | 7/1999 | Ellis et al. | |
| 5,927,644 A | 7/1999 | Ellis et al. | |
| 5,949,153 A | 9/1999 | Tison et al. | |
| 5,975,841 A | 11/1999 | Lindemuth et al. | |
| 5,985,470 A | 11/1999 | Spitsberg et al. | |
| 6,073,439 A | 6/2000 | Beaven et al. | |

(56) References Cited

U.S. PATENT DOCUMENTS

| | | | |
|---|---|---|---|
| 6,104,171 A | 8/2000 | Dvorsky et al. | |
| 6,126,110 A | 10/2000 | Seaquist et al. | |
| 6,138,949 A | 10/2000 | Manende et al. | |
| 6,189,830 B1 | 2/2001 | Schnelz et al. | |
| 6,209,311 B1 | 4/2001 | Itoh et al. | |
| 6,223,616 B1 | 5/2001 | Sheridan | |
| 6,260,351 B1 | 7/2001 | Delano et al. | |
| 6,315,815 B1 | 11/2001 | Spadaccini et al. | |
| 6,318,070 B1 | 11/2001 | Rey et al. | |
| 6,339,927 B1 | 1/2002 | DiPietro, Jr. | |
| 6,378,308 B1 | 4/2002 | Pfluger | |
| 6,387,456 B1 | 5/2002 | Eaton, Jr. et al. | |
| 6,398,161 B1* | 6/2002 | Jule | B64D 27/18 244/54 |
| 6,474,597 B1 | 11/2002 | Cazanave | |
| 6,517,027 B1 | 2/2003 | Abruzzese | |
| 6,517,341 B1 | 2/2003 | Brun et al. | |
| 6,555,929 B1 | 4/2003 | Eaton et al. | |
| 6,607,165 B1 | 8/2003 | Manteiga et al. | |
| 6,619,030 B1 | 9/2003 | Seda et al. | |
| 6,631,310 B1 | 10/2003 | Leslie | |
| 6,639,331 B2 | 10/2003 | Schultz | |
| 6,647,707 B2 | 11/2003 | Dev | |
| 6,652,222 B1 | 11/2003 | Wojtyczka et al. | |
| 6,653,821 B2 | 11/2003 | Kern et al. | |
| 6,657,416 B2 | 12/2003 | Kern et al. | |
| 6,663,530 B2 | 12/2003 | Poulin et al. | |
| 6,668,629 B1 | 12/2003 | Leslie | |
| 6,669,393 B2 | 12/2003 | Schilling | |
| 6,708,482 B2 | 3/2004 | Seda | |
| 6,708,925 B2 | 3/2004 | Udall | |
| 6,709,492 B1 | 3/2004 | Spadaccini et al. | |
| 6,732,502 B2 | 5/2004 | Seda et al. | |
| 6,735,954 B2 | 5/2004 | MacFarlane et al. | |
| 6,763,653 B2 | 7/2004 | Orlando et al. | |
| 6,792,759 B2 | 9/2004 | Rollins, III | |
| 6,814,541 B2 | 11/2004 | Evans et al. | |
| 6,843,449 B1 | 1/2005 | Manteiga et al. | |
| 6,847,297 B2 | 1/2005 | Lavoie et al. | |
| 6,855,089 B2 | 2/2005 | Poulin et al. | |
| 6,892,115 B2 | 5/2005 | Berkcan et al. | |
| 6,895,741 B2 | 5/2005 | Rago et al. | |
| 6,899,518 B2 | 5/2005 | Lucas et al. | |
| 6,909,942 B2 | 6/2005 | Andarawis et al. | |
| 6,914,763 B2 | 7/2005 | Reedy | |
| 6,935,591 B2 | 8/2005 | Udall | |
| 6,966,174 B2 | 11/2005 | Paul | |
| 6,976,655 B2 | 12/2005 | Thompson | |
| 6,985,784 B2 | 1/2006 | Vandevanter et al. | |
| 6,999,291 B2 | 2/2006 | Andarawis et al. | |
| 7,019,495 B2 | 3/2006 | Patterson | |
| 7,021,042 B2 | 4/2006 | Law | |
| 7,021,585 B2 | 4/2006 | Loewenstein et al. | |
| 7,043,340 B2 | 5/2006 | Papallo et al. | |
| 7,055,306 B2 | 6/2006 | Jones et al. | |
| 7,055,330 B2 | 6/2006 | Miller | |
| 7,104,918 B2 | 9/2006 | Mitrovic | |
| 7,134,286 B2 | 11/2006 | Markarian et al. | |
| 7,144,349 B2 | 12/2006 | Mitrovic | |
| 7,147,436 B2 | 12/2006 | Suciu et al. | |
| 7,195,446 B2 | 3/2007 | Seda et al. | |
| 7,216,475 B2 | 5/2007 | Johnson | |
| 7,219,490 B2 | 5/2007 | Dev | |
| 7,223,197 B2 | 5/2007 | Poulin et al. | |
| 7,246,484 B2 | 7/2007 | Giffin, III et al. | |
| 7,269,938 B2 | 9/2007 | Moniz et al. | |
| 7,299,621 B2 | 11/2007 | Bart et al. | |
| 7,301,738 B2 | 11/2007 | Pearlman et al. | |
| 7,309,210 B2 | 12/2007 | Suciu et al. | |
| 7,328,580 B2 | 2/2008 | Lee et al. | |
| 7,334,392 B2 | 2/2008 | Moniz et al. | |
| 7,338,259 B2 | 3/2008 | Shah et al. | |
| 7,374,403 B2 | 5/2008 | Decker et al. | |
| 7,406,830 B2 | 8/2008 | Valentian et al. | |
| 7,409,819 B2 | 8/2008 | Henry | |
| 7,500,365 B2 | 3/2009 | Suciu et al. | |
| 7,513,103 B2 | 4/2009 | Orlando et al. | |
| 7,527,220 B2 | 5/2009 | Dron | |
| 7,557,544 B2 | 7/2009 | Heinz et al. | |
| 7,591,754 B2 | 9/2009 | Duong et al. | |
| 7,594,404 B2 | 9/2009 | Somanath et al. | |
| 7,600,370 B2 | 10/2009 | Dawson | |
| 7,610,763 B2 | 11/2009 | Somanath et al. | |
| 7,632,064 B2 | 12/2009 | Somanath et al. | |
| 7,656,060 B2 | 2/2010 | Algrain | |
| 7,662,059 B2 | 2/2010 | McCune | |
| 7,665,293 B2 | 2/2010 | Wilson, Jr. et al. | |
| 7,685,808 B2 | 3/2010 | Orlando et al. | |
| 7,694,505 B2 | 4/2010 | Schilling | |
| 7,704,178 B2 | 4/2010 | Sheridan et al. | |
| 7,716,914 B2 | 5/2010 | Schilling | |
| 7,721,549 B2 | 5/2010 | Baran | |
| 7,762,086 B2 | 7/2010 | Schwark | |
| 7,765,786 B2 | 8/2010 | Klingels et al. | |
| 7,797,946 B2 | 9/2010 | Kumar et al. | |
| 7,806,651 B2 | 10/2010 | Kennepohl et al. | |
| 7,815,417 B2 | 10/2010 | Somanath et al. | |
| 7,816,813 B2 | 10/2010 | Yaguadayev et al. | |
| 7,824,305 B2 | 11/2010 | Duong et al. | |
| 7,832,193 B2 | 11/2010 | Orlando et al. | |
| 7,841,163 B2 | 11/2010 | Welch et al. | |
| 7,841,165 B2 | 11/2010 | Orlando et al. | |
| 7,871,247 B2 | 1/2011 | Shah et al. | |
| 7,882,691 B2 | 2/2011 | Lemmers, Jr. et al. | |
| 7,882,693 B2 | 2/2011 | Schilling | |
| 7,926,260 B2 | 4/2011 | Sheridan et al. | |
| 7,942,079 B2 | 5/2011 | Russ | |
| 7,942,580 B2 | 5/2011 | Audart-Noel et al. | |
| 7,950,237 B2 | 5/2011 | Grabowski et al. | |
| 7,959,532 B2 | 6/2011 | Suciu et al. | |
| 7,997,868 B1 | 8/2011 | Liang | |
| 8,015,798 B2 | 9/2011 | Norris et al. | |
| 8,015,828 B2 | 9/2011 | Moniz et al. | |
| 8,061,969 B2 | 11/2011 | Durocher et al. | |
| 8,074,440 B2 | 12/2011 | Kohlenberg et al. | |
| 8,075,261 B2 | 12/2011 | Merry et al. | |
| 8,091,371 B2 | 1/2012 | Durocher et al. | |
| 8,104,262 B2 | 1/2012 | Marshall | |
| 8,104,265 B2 | 1/2012 | Kupratis | |
| 8,104,289 B2 | 1/2012 | McCune et al. | |
| 8,106,633 B2 | 1/2012 | Dozier et al. | |
| 8,128,021 B2 | 3/2012 | Suciu et al. | |
| 8,166,748 B2 | 5/2012 | Schilling | |
| 8,172,717 B2 | 5/2012 | Lopez et al. | |
| 8,191,352 B2 | 6/2012 | Schilling | |
| 8,205,432 B2 | 6/2012 | Sheridan | |
| 8,220,245 B1 | 7/2012 | Papandreas | |
| 8,256,707 B2 | 9/2012 | Suciu et al. | |
| 8,297,916 B1 | 10/2012 | McCune et al. | |
| 8,297,917 B1 | 10/2012 | McCune et al. | |
| 8,313,280 B2 | 11/2012 | Hurwitz et al. | |
| 8,505,432 B2 | 8/2013 | Kidd et al. | |
| 8,695,920 B2 | 4/2014 | Suciu et al. | |
| 2002/0172593 A1* | 11/2002 | Udall | B64D 27/16 415/126 |
| 2003/0097844 A1* | 5/2003 | Seda | F01D 25/162 60/791 |
| 2003/0163984 A1* | 9/2003 | Seda | F01D 9/041 60/226.1 |
| 2003/0235523 A1 | 12/2003 | Lyubovsky et al. | |
| 2005/0138914 A1 | 6/2005 | Paul | |
| 2005/0257528 A1 | 11/2005 | Dunbar, Jr. | |
| 2006/0029894 A1 | 2/2006 | Zinn et al. | |
| 2006/0090448 A1 | 5/2006 | Henry | |
| 2006/0090451 A1* | 5/2006 | Moniz | F01D 1/24 60/226.1 |
| 2006/0130456 A1 | 6/2006 | Suciu et al. | |
| 2006/0177302 A1 | 8/2006 | Berry | |
| 2006/0179818 A1 | 8/2006 | Merchant | |
| 2006/0244327 A1 | 11/2006 | Kundel | |
| 2006/0248900 A1 | 11/2006 | Suciu et al. | |
| 2007/0084218 A1* | 4/2007 | Udall | F01D 9/041 60/796 |
| 2007/0125066 A1 | 6/2007 | Orlando et al. | |

(56) References Cited

U.S. PATENT DOCUMENTS

| | | | |
|---|---|---|---|
| 2007/0205323 A1* | 9/2007 | Lionel | B64D 27/26 244/53 R |
| 2007/0262661 A1 | 11/2007 | Ai | |
| 2008/0022653 A1 | 1/2008 | Schilling | |
| 2008/0056888 A1 | 3/2008 | Somanath et al. | |
| 2008/0073460 A1* | 3/2008 | Beardsley | B64D 27/26 244/54 |
| 2008/0098713 A1 | 5/2008 | Orlando et al. | |
| 2008/0116009 A1 | 5/2008 | Sheridan et al. | |
| 2008/0116010 A1 | 5/2008 | Portlock et al. | |
| 2008/0148881 A1 | 6/2008 | Moniz et al. | |
| 2008/0149445 A1 | 6/2008 | Kern et al. | |
| 2008/0169378 A1* | 7/2008 | Beaufort | B64D 27/26 244/54 |
| 2008/0184694 A1 | 8/2008 | Guimbard et al. | |
| 2008/0276621 A1 | 11/2008 | Somanath et al. | |
| 2008/0304974 A1 | 12/2008 | Marshall et al. | |
| 2008/0317588 A1* | 12/2008 | Grabowski | F01D 21/04 415/174.1 |
| 2009/0007569 A1 | 1/2009 | Lemmers, Jr. et al. | |
| 2009/0053058 A1 | 2/2009 | Kohlenberg et al. | |
| 2009/0056306 A1 | 3/2009 | Suciu et al. | |
| 2009/0056343 A1 | 3/2009 | Suciu et al. | |
| 2009/0067993 A1* | 3/2009 | Roberge | F02C 7/047 415/145 |
| 2009/0097967 A1 | 4/2009 | Smith et al. | |
| 2009/0155070 A1* | 6/2009 | Duchatelle | B64D 27/26 415/213.1 |
| 2009/0183512 A1* | 7/2009 | Suciu | B64D 27/18 60/797 |
| 2009/0229242 A1 | 9/2009 | Schwark | |
| 2009/0245997 A1 | 10/2009 | Hurwitz et al. | |
| 2009/0293445 A1 | 12/2009 | Ress, Jr. | |
| 2009/0314881 A1 | 12/2009 | Suciu et al. | |
| 2009/0317229 A1 | 12/2009 | Suciu et al. | |
| 2009/0320488 A1 | 12/2009 | Gilson et al. | |
| 2010/0005810 A1 | 1/2010 | Jarrell et al. | |
| 2010/0007207 A1 | 1/2010 | Peuser | |
| 2010/0080700 A1 | 4/2010 | Venter | |
| 2010/0105516 A1 | 4/2010 | Sheridan et al. | |
| 2010/0126141 A1 | 5/2010 | Schilling | |
| 2010/0127117 A1 | 5/2010 | Combes et al. | |
| 2010/0132376 A1 | 6/2010 | Durocher et al. | |
| 2010/0132377 A1 | 6/2010 | Durocher et al. | |
| 2010/0147997 A1 | 6/2010 | Martinou et al. | |
| 2010/0148396 A1 | 6/2010 | Xie et al. | |
| 2010/0154384 A1 | 6/2010 | Schilling | |
| 2010/0170980 A1 | 7/2010 | Haramburu et al. | |
| 2010/0181419 A1 | 7/2010 | Haramburu et al. | |
| 2010/0212281 A1 | 8/2010 | Sheridan | |
| 2010/0219779 A1 | 9/2010 | Bradbrook | |
| 2010/0301617 A1 | 12/2010 | Lundbladh | |
| 2010/0317477 A1 | 12/2010 | Sheridan et al. | |
| 2010/0326050 A1 | 12/2010 | Schilling et al. | |
| 2010/0331139 A1 | 12/2010 | McCune | |
| 2011/0056208 A1 | 3/2011 | Norris et al. | |
| 2011/0106510 A1 | 5/2011 | Poon | |
| 2011/0114786 A1 | 5/2011 | Guillet et al. | |
| 2011/0116510 A1 | 5/2011 | Breslin et al. | |
| 2011/0120078 A1 | 5/2011 | Schwark | |
| 2011/0120081 A1 | 5/2011 | Schwark | |
| 2011/0130246 A1 | 6/2011 | McCune et al. | |
| 2011/0149624 A1 | 6/2011 | Yamanaka | |
| 2011/0167790 A1 | 7/2011 | Cloft | |
| 2012/0007431 A1 | 1/2012 | Jang et al. | |
| 2012/0017603 A1 | 1/2012 | Bart et al. | |
| 2013/0011547 A1 | 1/2013 | Girard et al. | |
| 2013/0115476 A1 | 5/2013 | Castle et al. | |

FOREIGN PATENT DOCUMENTS

| | | | |
|---|---|---|---|
| EP | 1956224 | 8/2008 | |
| EP | 1959114 | 8/2008 | |
| EP | 2009249 | 12/2008 | |
| EP | 0860593 | 2/2009 | |
| EP | 2028359 | 2/2009 | |
| EP | 2098704 | 9/2009 | |
| EP | 2157305 | 2/2010 | |
| GB | 1309721 | 3/1973 | |
| GB | 1516041 | 6/1978 | |
| GB | 2041090 | 9/1980 | |
| GB | 2130340 | 5/1984 | |
| GB | 2199375 | 7/1988 | |
| GB | 2419639 | 5/2006 | |
| GB | 2426792 | 12/2006 | |
| WO | 2007038674 | 4/2007 | |
| WO | 2008045058 | 4/2008 | |
| WO | WO 2008045072 A1 * | 4/2008 | F02K 1/09 |

OTHER PUBLICATIONS

Ahmad, et al., "Single vs. Two Stage High Pressure Turbine Design of Modern Aero Engines", ASME 99-GT-1, 1999. Accessed from http://asmedigitalcollection.asme.org on Aug. 1, 2016.*

"Epicyclic gearing". (Oct. 23, 2007). In Wikipedia, The Free Encyclopedia. Retrieved 22:55, Sep. 6, 2017, from waybackmachine.com https://web.archive.org/web/20071023023829/en.wikipedia.org/wiki/epicyclic_gearing.*

Huff, D.L. Technologies for aircraft noise reduction. NASA Glenn Research Center. West Park Airport Committee Meeting. Feb. 16, 2006. pp. 1-23.

Hill, P.G. and Peterson, C.R. (1965). Mechanics and thermodynamics of propulsion. Reading, Massachusetts: Addison-Wesley Publishing Company. pp. 307-308.

International Preliminary Report on Patentability for PCT Application No. PCT/US2012/072271 dated Jul. 10, 2014.

European Search Report for European Application No. 12863186.8, dated Oct. 29, 2014.

European Search Report for European Application No. 12196028.0 dated Jun. 23, 2014.

European Search Report for European Application No. 12197866.2 dated Aug. 20, 2014.

Ciepluch et al. NASA Conference Publication. Quiet, powered-lift propulsion. Cleveland, Ohio. Nov. 14-15, 1978.

Civil Turbojet/Turbofan Specifications. Jet Engine Specification Database (Apr. 3, 2005). Retrieved from: http://www.jet-engine.net/civtfspec.html.

Kandebo, S.W. (1993). Geared-turbofan engine design targets cost, complexity. Aviation Week & Space Technology, 148(8), p. 32.

Hendricks, E.S. and Tong, M.T. (2012). Performance and weight estimates for an advanced open rotor engine. NASA/TM-2012-217710.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.

Zalud, T. (1998). Gears put a new spin on turbofan performance. Machine Design, 70(20), p. 104.

European Search Report for European Patent Application No. 15171345.0 dated Oct. 9, 2015.

Riegler, C. and Bichlmaier, C. (2007). The geared turbofan technology—opportunities, challenges and readiness stauts. Proceedings of the 1st CEAS European Air and Space Conference, Germany, German Society for Aeronautics and Astronautics (D, Sep. 11, 2007).

Engber, M. et al. (2007). Advanced technologies for next generation regional jets—survey of research activities at MTU Aero Engines. Proceedings of the 18th ISABE Conference, China, International Society of Airbreathing Engines (ISA, Sep. 7, 2007). p. 1-11.

Berton, J.J. and Envia, E. (2010). An analytical assessment of NASA's N+1 subsonic fixed wing project noise goal. NASA/TM-2010-216085, the United States, (AIAA, Feb. 1, 2010).

Roux, E. (2007). Turbofan and turbojet engines database handbook. Editions Elodie Roux. Blagnac: France. pp. 1-595.

U.S. Appl. No. 11/832,107, dated Aug. 1, 2007, Engine Mounting Configuration for a Turbofan Gas Turbine Engine.

International Search Report & Written Opinion for PCT Application No. PCT/US2012/072271 dated Mar. 8, 2013.

(56) References Cited

OTHER PUBLICATIONS

Sessions, R. (1985). Turbo Hydra-Matic 350 handbook. The Berkley Publishing Group. pp. 24-25.
Honeywell TFE731. Jane's Aero-engines, Aero-engines—Turbofan. Jul. 18, 2012.
Honeywell LF507. Jane's Aero-engines, Aero-engines—Turbofan. Feb. 9, 2012.
Lord, W.K. (2000). Flow control opportunities in gas turbine engines. AIAA 2000-2234, Fluids 2000, Denver, Colorado. Jun. 19-22, 2000. pp. 1-15.
Baskharone, E. (2006). Principles of turbomachinery in air-breathing engines. Cambridge University Press. pp. 261-263.
Nagendra, S. (2005). Optimal rapid multidisciplinary response networks: RAPIDDISK. Stuct Multidisk Optim 29, pp. 213-231.
Guha, A. (2001). Optimum fan pressure ration for bypass engines with separate or mixed exhaust streams. Journal of Propulsion and Power, 17(5). Sep.-Oct.
Web Article. GE's breakthrough GEnx debuts at the Paris Air Show. Jun. 15, 2009. Retrieved Jan. 23, 2012 from: http://www.gereports.com/ges-breakthrough-genx-debuts-at-the-paris-air-show/.
Web Article. GE Aviation. GEnx-28 first engine to test. Retrieved Jan. 28, 2012 from: http://www.geaviation.com/engines/commercial/genx/2b_fett.html.
Diagram of prior art V2500 and PW4090 engines.
Mattingly, J.D. (2002). Aircraft engine design. American Institute of Aeronautics and Astronautics, 2nd Edition, p. 292.
Kjelgaard, C. (2010). Gear up for the GTF. Aircraft Technology, 105. Apr.-May 2010. pp. 86, 88, 90, 92-95.
Ruach, D. (1972). Design study of an air pump and integral lift engine ALF-504 using the Lycoming 502 core. NASA Report CR-120992. NASA Lewis Research Center. Cleveland, OH. 1972. pp. 1-182.
Warwick, G. (2007). Civil engines: Pratt & Whitney gears up for the future with GTF. Flight International, Nov. 2007. Retrieved Jun. 14, 2016 from: https://www.flightglobal.com/news/articles/civil-engines-pratt-amp-whitney-gears-up-for-the-future-with-219989/.
Coy, Peter. The little gear that could reshape the jet engine: A simple idea's almost 30-year, $10 billion journey oto the aircraft mainstream. Bloomberg Business. Oct. 15, 2015. p. 1-4.
Read, B. (2014). Powerplant revolution. AeroSpace. May 2014. pp. 28-31.
Gunston, B. Ed. (2000). Jane's aero-engines. Issue Seven. Jane's Information Group, Inc. Alexandria, VA. pp. 1-47, 61, and 464-512.
Boggia, S. and Rud, K. (2005). Intercooled recuperated gas turbine engine concept. AIAA 2005-4192, 41st AIAA/ASME/SAE/ASEE Joint Propulsion Conference & Exhibit, Jul. 10-13, 2005, Tucson, Arizona, p. 1-11.
Lord, W.K. (2000). P&W expectations. Quiet Aircraft Technology Workshop, Dallas, TX. Apr. 11-12, 2000. pp. 1-7.
Petition for Inter Partes Review of U.S. Pat. No. 8,511,605, Claims 1-6 and 12-16. *General Electric Company*, Petitioner v. *United Technologies Corporation*, Patent Owner. Filed Jan. 29, 2016.
Petition for Inter Partes Review of U.S. Pat. No. 8,511,605, Claims 1,2, and 7-11. *General Electric Company*, Petitioner v. *United Technologies Corporation*, Patent Owner. Filed Jan. 29, 2016.
Declaration of Reza Abhari, Ph.D in connection with the petition for inter partes review for U.S. Pat. No. 8,511,605 (challenged claims 1-6 and 12-16) executed Jan. 12, 2016.
Declaration of Reza Abhari, Ph.D in connection with the petition for inter partes review for U.S. Pat. No. 8,511,605 (challenged claims 1,2, and 7-11) executed Jan. 12, 2016.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Brochure. LEAP: The power of the future. 2013. Retrieved from: http://www.cfmaeroengines.com.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-1, 56-8, 60-1, 64-71, 87-9, 324-9, 436-7.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers, 108(8), 65-67.
Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report. NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.

(56) References Cited

OTHER PUBLICATIONS

Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Edkins, D.P. and Hirschkron, R.L. (1972). TF34 turbofan quiet engine study final report. NASA CR-120914. Dec. 31, 1972. pp. 1-96.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 88,313,280. Executed Oct. 21, 2016. pp. 1-88.
Daly, M. Ed. (2010). Jane's Aero-Engine. Issue Twenty-seven. Mar. 2010. p. 633-636.
Decision Institution of Inter Partes Review. *General Electric Co.*, Petitioner, v. *United Technologies Corp.*, Patent Owner. IPR2016-00531. U.S. Pat. No. 8,511,605. Entered Jun. 30, 2016. pp. 1-16.
Whitaker, R. (1982). ALF 502: plugging the turbofan gap. Flight International, p. 237-241, Jan. 30, 1982.
Muni, R. (1981). Aircraft technology assessment: Progress in low emissions engine. Technical Report. May 1981. pp. 1-171.
Waters, M.H. and Schairer, E.T. (1977). Analysis of turbofan propulsion system weight and dimensions. NASA Technical Memorandum. Jan. 1977. pp. 1-65.
Avco Lycoming Divison. ALF 502L Maintenance Manual. Apr. 1981. pp. 1-118.
Type Certificate Data Sheet No. E6NE. Department of Transportation Federal Aviation Administration. Jun. 7, 2002. pp. 1-10.

Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Jane's Aero-engines, Aero-engines—Turbofan. Feb. 9, 2012.
Honeywell LF502. Jane's Aero-engines, Aero-engines—Turbofan. Aug. 17, 2016.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Rauch, D. (1972). Design study of an air pump and integral lift engine ALF-504 using the Lycoming 502 core. Prepare for NASA. Jul. 1972. pp. 1-182.
Dassault Falcon 900EX Easy Systems Summary. Retrieved from: http://www.smartcockpit.com/docs/F900EX-Engines.pdf pp. 1-31.
Honeywell TFE731 Pilot Tips. pp. 1-143.
Honeywell TFE731-5AR to -5BR Engine Conversion Program. Sep. 2005. pp. 1-4.
Garret TFE731 Turbofan Engine (CAT C). Chapter 79: Lubrciation System. TTFE731 Issue 2. 2010. pp. 1-24.
Notice of Opposition to Patent No. EP 2610460. United Technologies Corporation opposed by SNECMA. Mailed Apr. 27, 2016.
Patentee's Request to Notice of Opposition to U.S. Pat. No. 2610460. United Technologies Corporation opposed by Safran Aircraft Engines. Mailed Oct. 17, 2016.
Decision. *General Electric Company.*, Petitioner, v. *United Technologies Corp.*, Patent Owner. IPR2017-00425. U.S. Pat. No. 8,448,895 B2. Entered Jul. 3, 2017. pp. 1-29.
Final Written Decision. *General Electric Company.*, Petitioner, v. *United Technologies Corp.*, Patent Owner. IPR2016-00531. U.S. Pat. No. 8,511,605 B2. Entered Jun. 26, 2017. pp. 1-35.
Final Written Decision. *General Electric Company.*, Petitioner, v. *United Technologies Corp.*, Patent Owner. IPR2016-00533. U.S. Pat. No. 8,511,605 B2. Entered Jun. 26, 2017. pp. 1-19.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003.. p. 1-6 and Appendices.

(56) References Cited

OTHER PUBLICATIONS

Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
"Shah, D.M. (1992). MoSi2 and other silicides as high temperature structural materials. Superalloys 1992. The Minerals, Metals, & Materials Society. pp. 409-422."
Zhao, J.C. and Westbrook, J.H. (2003). Ultrahigh-temperature materials for jet engines. MRS Bulletin. vol. 28(9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMGs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76(1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Leckie, F.A. and Dal Bello, D.J. (2009). Strength and stiffness of engineering systems. Mechanical Engineering Series. Springer. pp. 1-3.

El-Sayad, A.F. (2008). Aircraft propulsion and gas turbine engines. Boca Raton, FL: CRC Press. pp. 215-219 and 855-860.
Bunker, R.S. (2005). A review of shaped hole turbine film-cooling technology. Journal of Heat Transfer vol. 127. Apr. 2005. pp. 441-453.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Baker, R.W. (2000). Membrane technology and applications. New York, NY: McGraw-Hill pp. 87-153.
Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubircant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

(56) References Cited

OTHER PUBLICATIONS

Technical Data. Teflon. WS Hampshire Inc. Retrieved from: http://catalog.wshampshire.com/Asset/psg_teflon_ptfe.pdf.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Edkins, D.P., Hirschkron, R., and Lee, R. (1972). TF34 turbofan quiet engine study. Final Report prepared for NASA. NASA-CR-120914. Jan. 1, 1972. pp. 1-99.

Meyer, A.G. (1988). Transmission development of TEXTRON Lycoming's geared fan engine. Technical Paper. Oct. 1988. pp. 1-12.

Dudley, D.W., Ed. (1962). Gear handbook. New York, NY: McGraw-Hill. pp. 14-17 (TOC, Preface, and Index).

Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

Kaplan, B., Nicke, E., Voss, C. (2006). Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Gates, D. Bombardier flies at higher market. Seattle Times.

Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.

Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

McCune, M.E. (1993). Initial test results of 40,000 horsepower fan drive gear system for advanced ducted propulsion systems. AIAA 29th Joint Conference and Exhibit. Jun. 28-30, 1993. pp. 1-10.

Wright, G.H. and Russell, J.G. (1990). The M.455D-02 variable pitch geared fan engine demonstrator test and evaluation experience. Aeronautical Journal., vol. 84(836). Sep. 1980. pp. 268-277.

Drago, R.J. (1974). Heavy-lift helicopter brings up drive ideas. Power Transmission Design. Mar. 1987. pp. 1-15.

Krantz, T.L. (1990). Experimental and analytical evaluation of efficiency of helicopter planetary stage. NASA Technical Paper. Nov. 1990. pp. 1-19.

Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.

Decision. *General Electric Company.*, Petitioner, v. *United Technologies Corp.*, Patent Owner. IPR2017-00431. U.S. Pat. No. 8,695,920 B2. Entered Jun. 26, 2017 pp. 1-20.

Decision. *General Electric Company.*, Petitioner, v. *United Technologies Corp.*, Patent Owner. IPR2017-00428. U.S. Pat. No. 8,695,920 B2. Entered Jun. 26, 2017 pp. 1-21.

Munt, R. (1981). Aircraft technology assessment: Progress in low emissions engine. Technical Report. May 1981. pp. 1-171.

Judgement and Final Written Decision. U.S. Pat. No. 8,695,920. *General Electric Company*, Petitioner, v. *United Technologies Corporation*, Patent Owner. IPR2017-00428. Entered Dec. 19.

Final Written Decision. *General Electric Company*, Petitioner, v. *United Technologies Corporation*, Patent Owner. IPR2017-00428. U.S. Pat. No. 8,695,920. Entered Jun. 22, 2018. pp. 1-40.

Patent Owner's Response to Petition for Inter Partes Review of U.S. Pat. No. 8,695,920. *General Electric Company*, Petitioner, v. *United Technologies Corporation*, Patent Owner. IPR2017-00428. Filed Sep. 8, 2017.

Patent Owner's Preliminary Response. *General Electric Company.*, Petitioner, v. *United Technologies Corp.*, Patent Owner. IPR2017-00428. U.S. Pat. No. 8,695,920. Entered Apr. 10, 2017. pp. 1-36.

Krauskopf, L. and Shumaker, L. (2014). GE exec says avoided geared design in jet engine battle with Pratt. Rueters. Sep. 14, 2014. http://www.reuters.com/article/us-general-electric-united-tech-engine-idUSKBN0HA2H620140915.

Flying's new gear. (Jan. 2, 2016). The Economist. Retrieved from: https://www.economist.com/science-and-technology/2015/12/30/flyings-new-gear.

Tsang, D. (2011). Special report: The engine battle heats up (update 1). Aspire Aviation. May 10, 2011. Retrieved from: http://www.aspireaviation.com/2011/05/10/pw-purepower-engine-vs-cfm-leap-x.

United Technologies: Rethinking jet engines to make commercial aviation less of a threat to the climate (and the human respiratory system). Fortune. Retrieved Sep. 29, 2016 from: http://beta.fortune.com/change-the-world/united-technologies-8.

Pratt & Whitney JT3D/TF33. www.All-Aero.com. Retrieved Apr. 9, 2017 from http://all-aero.com/index.php/contactus/64-engines-power/13428-pratt-whitney-jt3d-tf33.

Turbofan engine JT8D cutaway model AE-06. AeroTrain Corp. Retrieved Apr. 9, 2017 from: http://aerotraincorp.com/ae-06.php.

JT15D. Pratt & Whitney Canada Retrieved Apr. 9, 2017 from: http://www.pwc.ca/en/engines/jt15d.

Rolls-Royce RB211022 turbofan engine, cutaway. National Air and Space Museum. Retrieved Apr. 9, 2017 from: https://airandspace.si.edu/collection-objects/rolls-royce-rb211-22-turbofan-engine-cutaway.

Yazzie, C. (2013). CFM-56 turbofan jet engines. Retrieved Apr. 9, 2017 from: https://prezi.com/lqwqiuchmgd0/cfm-56-turbofan-jet-engines.

CFM56 engine. Delta TechOps. Retrieved Apr. 9, 2017 from: http://www.deltatechops.com/mro-capabilites/view/category/cfm56.

U.S. Department of Transportation: Federal Aviation Administration Type Certificate Data Sheet No. E46NE Dated: Jan. 23, 2012. p. 1-7.

Judgement and Final Written Decision. U.S. Pat. No. 8,448,895. *General Electric Company*, Petitioner, v. *United Technologies Corporation*, Patent Owner. IPR2017-00425. Entered Jul. 2, 2018.

Disclaimer in Patent Under 37 CFR 1.321(a) for U.S. Pat. No. 8,695,920.

Gray, D.E. and Gardner, W.B. (1983). Energy efficient engine program technology benefit/cost study—vol. 2. NASA CR-174766. Oct. 1983. pp. 1-118.

\* cited by examiner

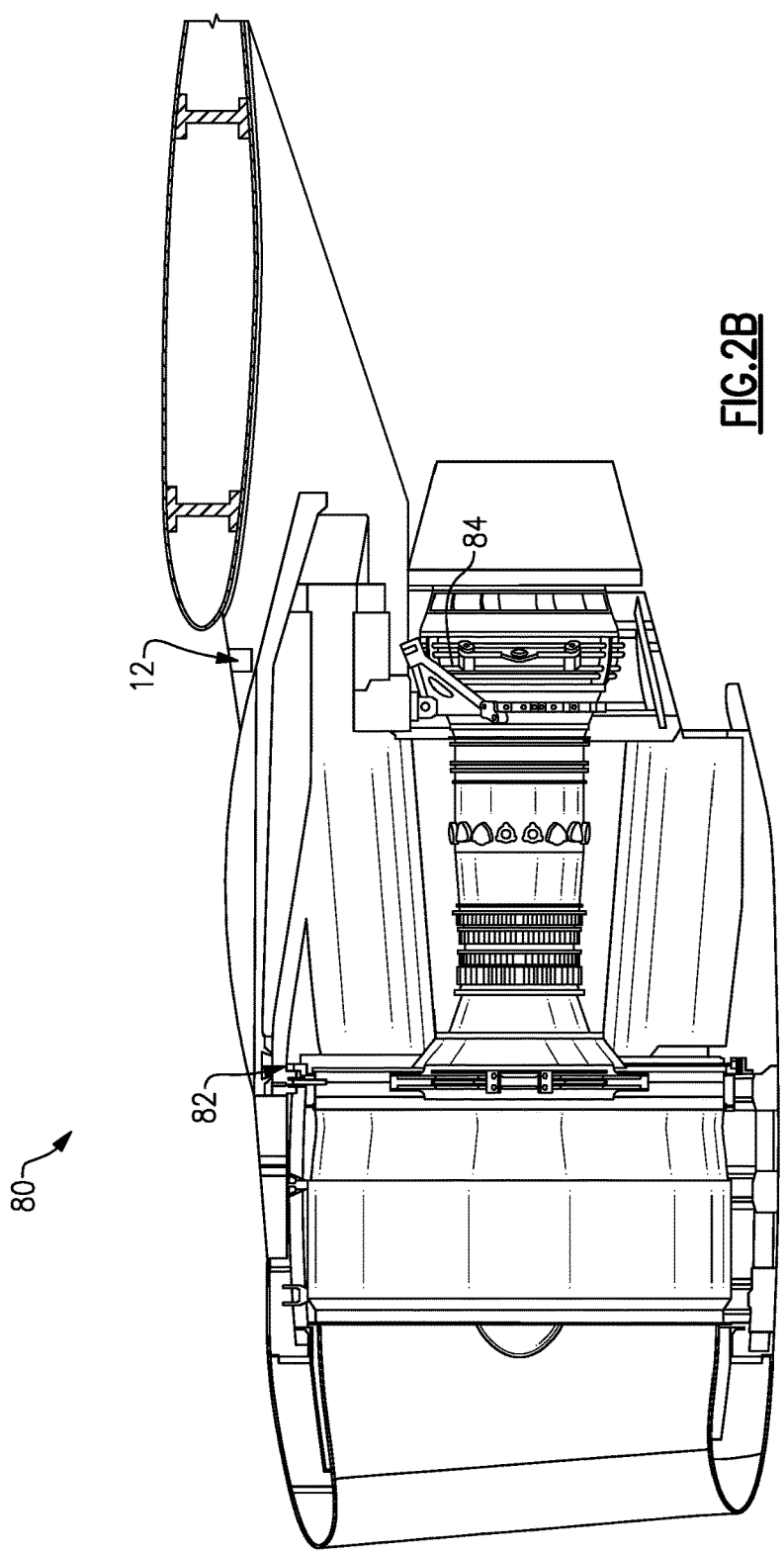

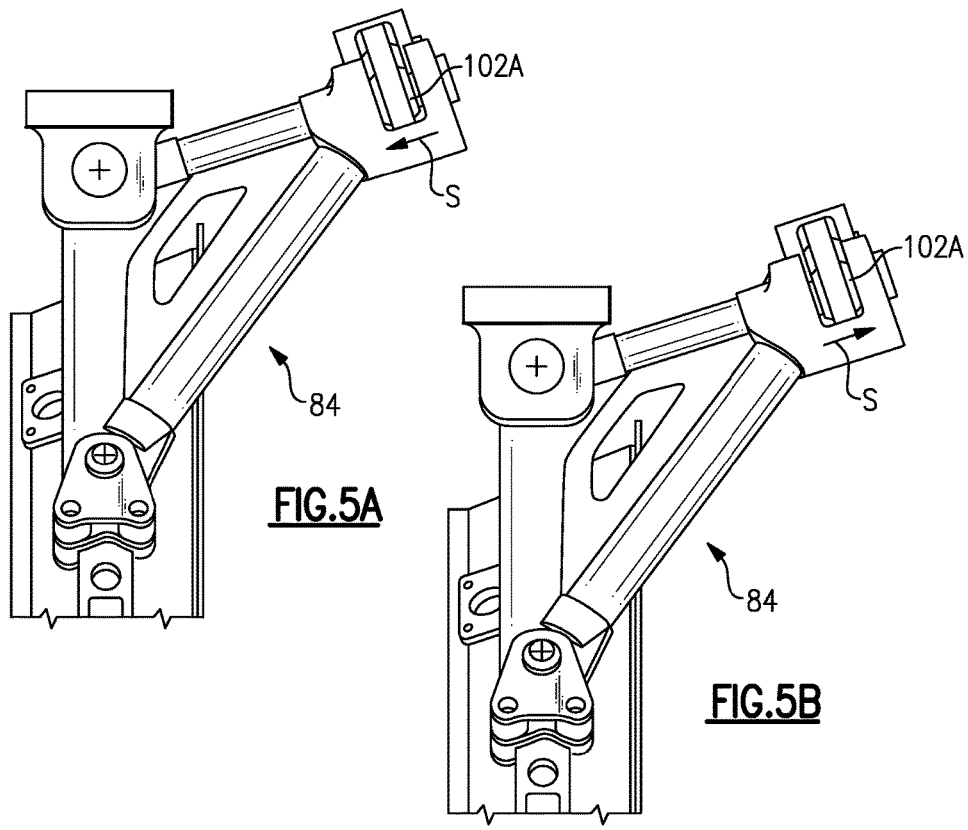
FIG.5A
FIG.5B
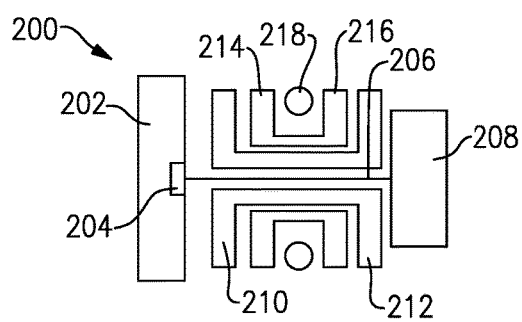
FIG.6
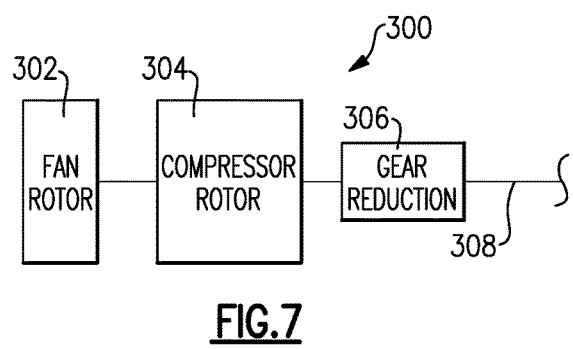
FIG.7

GAS TURBINE ENGINE WITH LOW STAGE COUNT LOW PRESSURE TURBINE

CROSS REFERENCE TO RELATED APPLICATIONS

The present disclosure is a continuation of U.S. patent application Ser. No. 14/755,221, filed Jun. 30, 2015, which is a continuation of U.S. patent application Ser. No. 14/190,429, filed Feb. 26, 2014, which was a continuation-in-part of U.S. patent application Ser. No. 13/340,988, filed Dec. 30, 2011, which was a continuation-in-part of U.S. patent application Ser. No. 12/131,876, filed Jun. 2, 2008.

BACKGROUND

The present invention relates to a gas turbine engine and more particularly to an engine mounting configuration for the mounting of a turbofan gas turbine engine to an aircraft pylon.

A gas turbine engine may be mounted at various points on an aircraft such as a pylon integrated with an aircraft structure. An engine mounting configuration ensures the transmission of loads between the engine and the aircraft structure. The loads typically include the weight of the engine, thrust, aerodynamic side loads, and rotary torque about the engine axis. The engine mount configuration must also absorb the deformations to which the engine is subjected during different flight phases and the dimensional variations due to thermal expansion and retraction.

One conventional engine mounting configuration includes a pylon having a forward mount and an aft mount with relatively long thrust links which extend forward from the aft mount to the engine intermediate case structure. Although effective, one disadvantage of this conventional type mounting arrangement is the relatively large "punch loads" into the engine cases from the thrust links which react the thrust from the engine and couple the thrust to the pylon. These loads tend to distort the intermediate case and the low pressure compressor (LPC) cases. The distortion may cause the clearances between the static cases and rotating blade tips to increase which may negatively affect engine performance and increase fuel burn.

SUMMARY

A gas turbine engine according to an exemplary aspect of the present disclosure includes a core nacelle defined about an engine centerline axis, a fan nacelle mounted at least partially around the core nacelle to define a fan bypass airflow path for a fan bypass airflow, a gear train defined along an engine centerline axis, the gear train defines a gear reduction ratio of greater than or equal to about 2.3, a spool along the engine centerline axis which drives the gear train, the spool includes a three to six (3-6) low pressure turbine, and a fan variable area nozzle axially movable relative to the fan nacelle to vary a fan nozzle exit area and adjust a pressure ratio of the fan bypass airflow during engine operation.

In a further non-limiting embodiment of any of the foregoing gas turbine engine embodiments, the gear train may define a gear reduction ratio of greater than or equal to about 2.5.

In a further non-limiting embodiment of any of the foregoing gas turbine engine embodiments, the engine may further include a controller operable to control the fan variable area nozzle to vary the fan nozzle exit area and adjust the pressure ratio of the fan bypass airflow.

In a further non-limiting embodiment of any of the foregoing gas turbine engine embodiments, the controller may be operable to reduce the fan nozzle exit area at a cruise flight condition. Additionally or alternatively, the controller may be operable to control the fan nozzle exit area to reduce a fan instability.

In a further non-limiting embodiment of any of the foregoing gas turbine engine embodiments, the fan variable area nozzle may define a trailing edge of the fan nacelle.

In a further non-limiting embodiment of any of the foregoing gas turbine engine embodiments, the gear train may drive a fan within the fan nacelle.

In a further non-limiting embodiment of any of the foregoing gas turbine engine embodiments, the low pressure turbine may be a five (5) stage low pressure turbine.

In a featured embodiment, a gas turbine engine comprises a gear train defined along an axis. A spool along the axis drives the gear train and includes a low stage count low pressure turbine. A fan is rotatable at a fan speed about the axis and driven by the low pressure turbine through the gear train. The fan speed is less than a speed of the low pressure turbine. A core is surrounded by a core nacelle defined about the axis. A fan nacelle is mounted at least partially around the core nacelle to define a fan bypass airflow path for a fan bypass airflow. A bypass ratio defined by the fan bypass passage airflow divided by airflow through the core is greater than about ten (10).

In another embodiment according to the previous embodiment, the low stage count includes six or fewer stages.

In another embodiment according to any of the previous embodiments, the low pressure turbine is one of three turbine rotors. The low pressure turbine drives the fan, while the other two of the turbine rotors each drive a compressor section.

In another embodiment according to any of the previous embodiments, a high pressure turbine is also included, with each of the low pressure turbine and the high pressure turbine driving a compressor rotor.

In another embodiment according to any of the previous embodiments, the gear train is positioned intermediate a compressor rotor driven by the low pressure turbine and the fan.

In another embodiment according to any of the previous embodiments, the gear train is positioned intermediate the low pressure turbine and the compressor rotor is driven by the low pressure turbine.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows:

FIG. 2B is a side view of an engine mount system within a nacelle system;

FIG. 5A is a side view of the aft mount of FIG. 4A in a first slide position; and FIG. 5B is a side view of the aft mount of FIG. 4A in a second slide position.

FIG. 6 shows another embodiment.

FIG. 7 shows yet another embodiment.

DETAILED DESCRIPTION

Figure 1A:
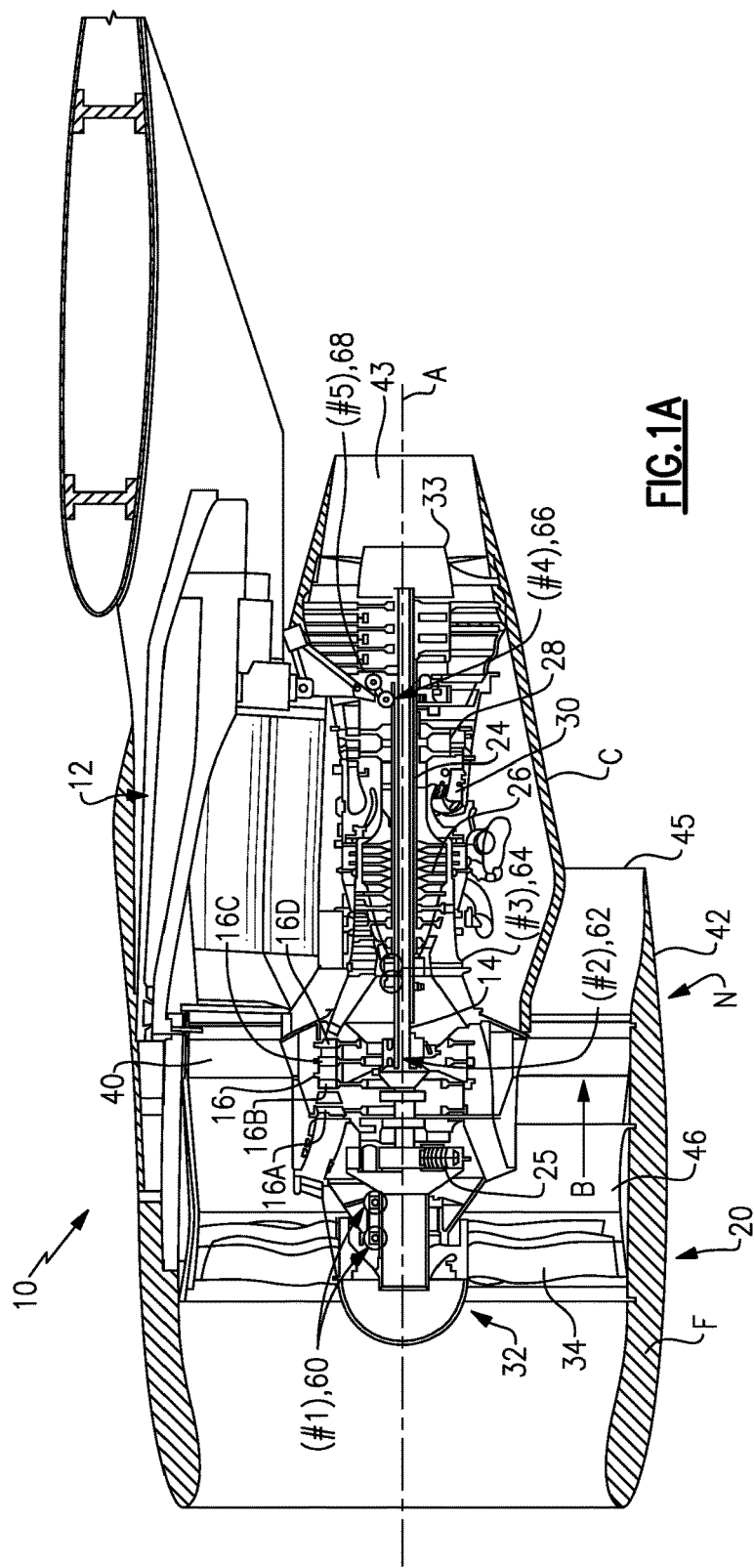
FIG. 1A is a general schematic sectional view through a gas turbine engine along the engine longitudinal axis.

FIG. 1A illustrates a general partial fragmentary schematic view of a gas turbofan engine 10 suspended from an engine pylon 12 within an engine nacelle assembly N as is typical of an aircraft designed for subsonic operation.

The turbofan engine 10 includes a core engine within a core nacelle C that houses a low spool 14 and high spool 24. The low spool 14 includes a low pressure compressor 16 and low pressure turbine 18. The low spool 14 drives a fan section 20 connected to the low spool 14 either directly or through a gear train 25.

The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 in one non-limiting embodiment is a high-bypass geared architecture aircraft engine. In one disclosed, non-limiting embodiment, the engine 10 bypass ratio is greater than about six (6), with an example embodiment being greater than about ten (10), the gear train 25 is an epicyclic gear train such as a planetary gear system or other gear system with a gear reduction ratio of greater than about 2.3 and the low pressure turbine 18 has a pressure ratio that is greater than about 5. In one disclosed embodiment, the engine 10 bypass ratio is greater than ten (10:1), the turbofan diameter is significantly larger than that of the low pressure compressor 16, and the low pressure turbine 18 has a pressure ratio that is greater than 5:1. The gear train 25 may be an epicycle gear train such as a planetary gear system or other gear system with a gear reduction ratio of greater than about 2.5:1. It should be understood, however, that the above parameters are only exemplary of one embodiment of a geared architecture engine and that the present invention is applicable to other gas turbine engines including direct drive turbofans.

Airflow enters the fan nacelle F which at least partially surrounds the core nacelle C. The fan section 20 communicates airflow into the core nacelle C to the low pressure compressor 16. Core airflow compressed by the low pressure compressor 16 and the high pressure compressor 26 is mixed with the fuel in the combustor 30 where is ignited, and burned. The resultant high pressure combustor products are expanded through the high pressure turbine 28 and low pressure turbine 18. The turbines 28, 18 are rotationally coupled to the compressors 26, 16 respectively to drive the compressors 26, 16 in response to the expansion of the combustor product. The low pressure turbine 18 also drives the fan section 20 through gear train 25. A core engine exhaust E exits the core nacelle C through a core nozzle 43 defined between the core nacelle C and a tail cone 33.

Figure 1B:
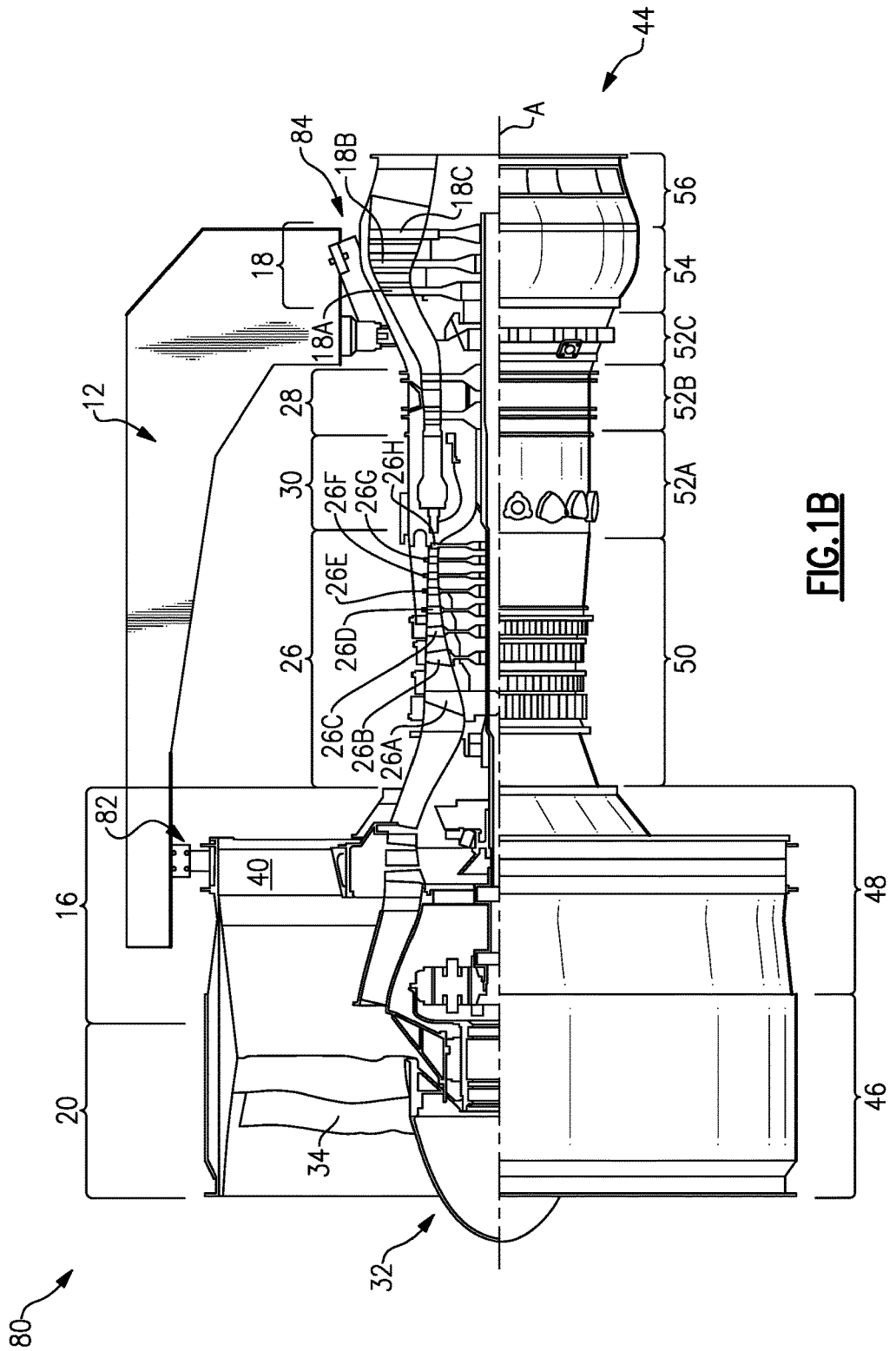
FIG. 1B is a general sectional view through a gas turbine engine along the engine longitudinal axis illustrating an engine static structure case arrangement on the lower half thereof.

With reference to FIG. 1B, the low pressure turbine 18 includes a low number of stages, which, in the illustrated non-limiting embodiment, includes three turbine stages, 18A, 18B, 18C. The gear train 25 operationally effectuates the significantly reduced number of stages within the low pressure turbine 18. The three turbine stages, 18A, 18B, 18C facilitate a lightweight and operationally efficient turbine architecture. It should be appreciated that a low number of stages contemplates, for example, three to six (3-6) stages. Low pressure turbine 18 pressure ratio is pressure measured prior to inlet of low pressure turbine 18 as related to the pressure at the outlet of the low pressure turbine 18 prior to exhaust nozzle.

Thrust is a function of density, velocity, and area. One or more of these parameters can be manipulated to vary the amount and direction of thrust provided by the bypass flow B. The Variable Area Fan Nozzle ("VAFN") 42 operates to effectively vary the area of the fan nozzle exit area 45 to selectively adjust the pressure ratio of the bypass flow B in response to a controller (not shown). Low pressure ratio turbofans are desirable for their high propulsive efficiency. However, low pressure ratio fans may be inherently susceptible to fan stability/flutter problems at low power and low flight speeds. The VAFN 42 allows the engine to change to a more favorable fan operating line at low power, avoiding the instability region, and still provide the relatively smaller nozzle area necessary to obtain a high-efficiency fan operating line at cruise.

A significant amount of thrust is provided by the bypass flow B due to the high bypass ratio. The fan section 20 of the engine 10 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without the Fan Exit Guide Vane ("FEGV") system 36. The low fan pressure ratio as disclosed herein according to one non-limiting embodiment is less than about 1.45. "Low corrected fan tip speed" is the actual fan tip speed in ft/sec divided by an industry standard temperature correction of $[(Tambient\ deg\ R)/518.7)^{\wedge}0.5]$. The "Low corrected fan tip speed" as disclosed herein according to one non-limiting embodiment is less than about 1150 ft/second.

As the fan blades within the fan section 20 are efficiently designed at a particular fixed stagger angle for an efficient cruise condition, the VAFN 42 is operated to effectively vary the fan nozzle exit area 45 to adjust fan bypass air flow such that the angle of attack or incidence on the fan blades is maintained close to the design incidence for efficient engine operation at other flight conditions, such as landing and takeoff to thus provide optimized engine operation over a range of flight conditions with respect to performance and other operational parameters such as noise levels.

The engine static structure 44 generally has sub-structures including a case structure often referred to as the engine backbone. The engine static structure 44 generally includes a fan case 46, an intermediate case (IMC) 48, a high pressure compressor case 50, a combustor case 52A, a high pressure turbine case 52B, a thrust case 52C, a low pressure turbine case 54, and a turbine exhaust case 56 (FIG. 1B). Alternatively, the combustor case 52A, the high pressure turbine case 52B and the thrust case 52C may be combined into a single case. It should be understood that this is an exemplary configuration and any number of cases may be utilized.

The fan section 20 includes a fan rotor 32 with a plurality of circumferentially spaced radially outwardly extending fan blades 34. The fan blades 34 are surrounded by the fan case 46. The core engine case structure is secured to the fan case 46 at the IMC 48 which includes a multiple of circumferentially spaced radially extending struts 40 which radially span the core engine case structure and the fan case 46.

The engine static structure 44 further supports a bearing system upon which the turbines 28, 18, compressors 26, 16 and fan rotor 32 rotate. A #1 fan dual bearing 60 which rotationally supports the fan rotor 32 is axially located generally within the fan case 46. The #1 fan dual bearing 60 is preloaded to react fan thrust forward and aft (in case of surge). A #2 LPC bearing 62 which rotationally supports the low spool 14 is axially located generally within the intermediate case (IMC) 48. The #2 LPC bearing 62 reacts thrust. A #3 fan dual bearing 64 which rotationally supports the high spool 24 and also reacts thrust. The #3 fan bearing 64 is also axially located generally within the IMC 48 just forward of the high pressure compressor case 50. A #4 bearing 66 which rotationally supports a rear segment of the low spool 14 reacts only radial loads. The #4 bearing 66 is axially located generally within the thrust case 52C in an aft section thereof. A #5 bearing 68 rotationally supports the rear segment of the low spool 14 and reacts only radial loads. The #5 bearing 68 is axially located generally within the thrust case 52C just aft of the #4 bearing 66. It should be understood that this is an exemplary configuration and any number of bearings may be utilized.

Figure 1C:
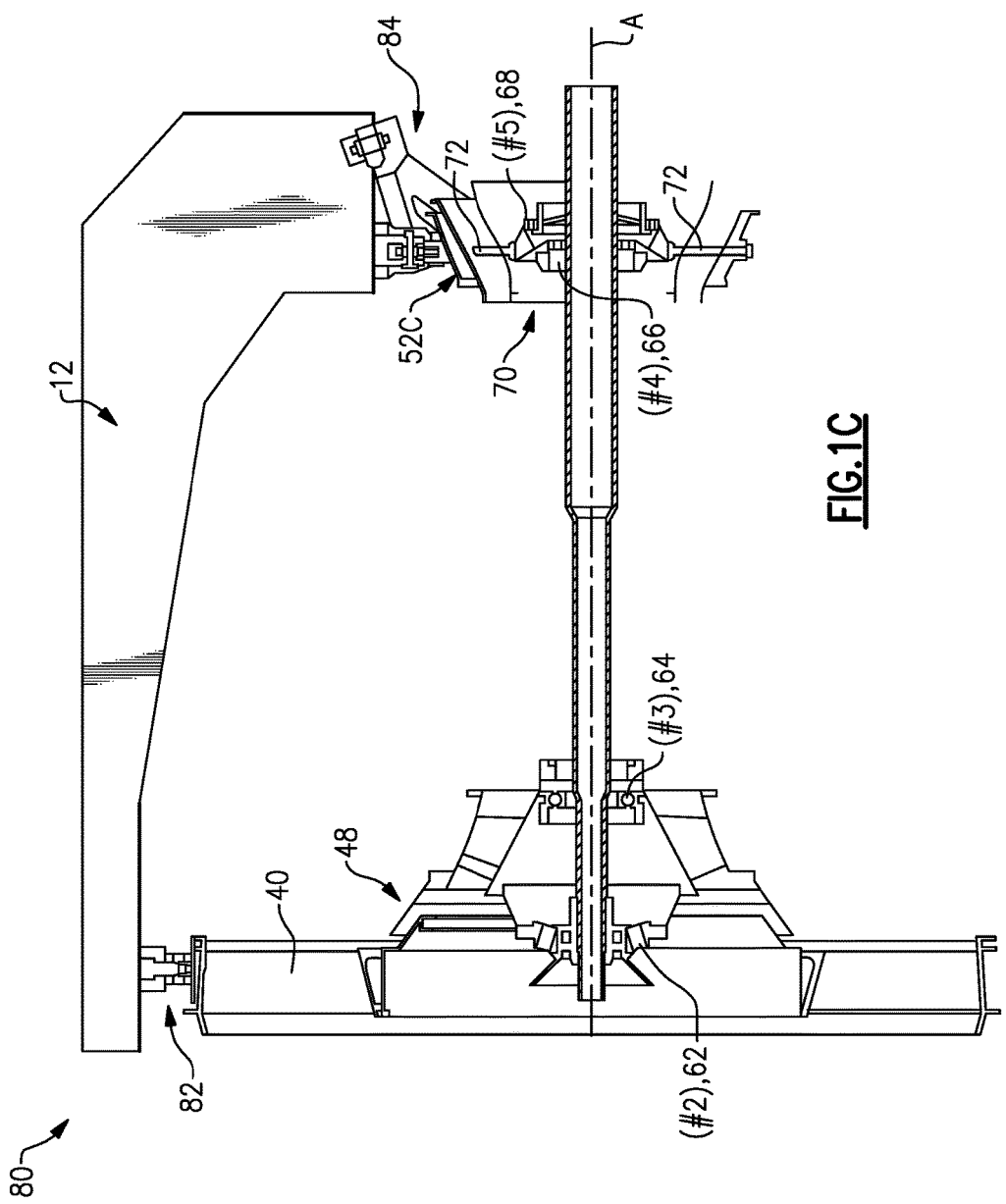
FIG. 1C is a side view of an mount system illustrating a rear mount attached through an engine thrust case to a mid-turbine frame between a first and second bearing supported thereby.
Figure 1D:
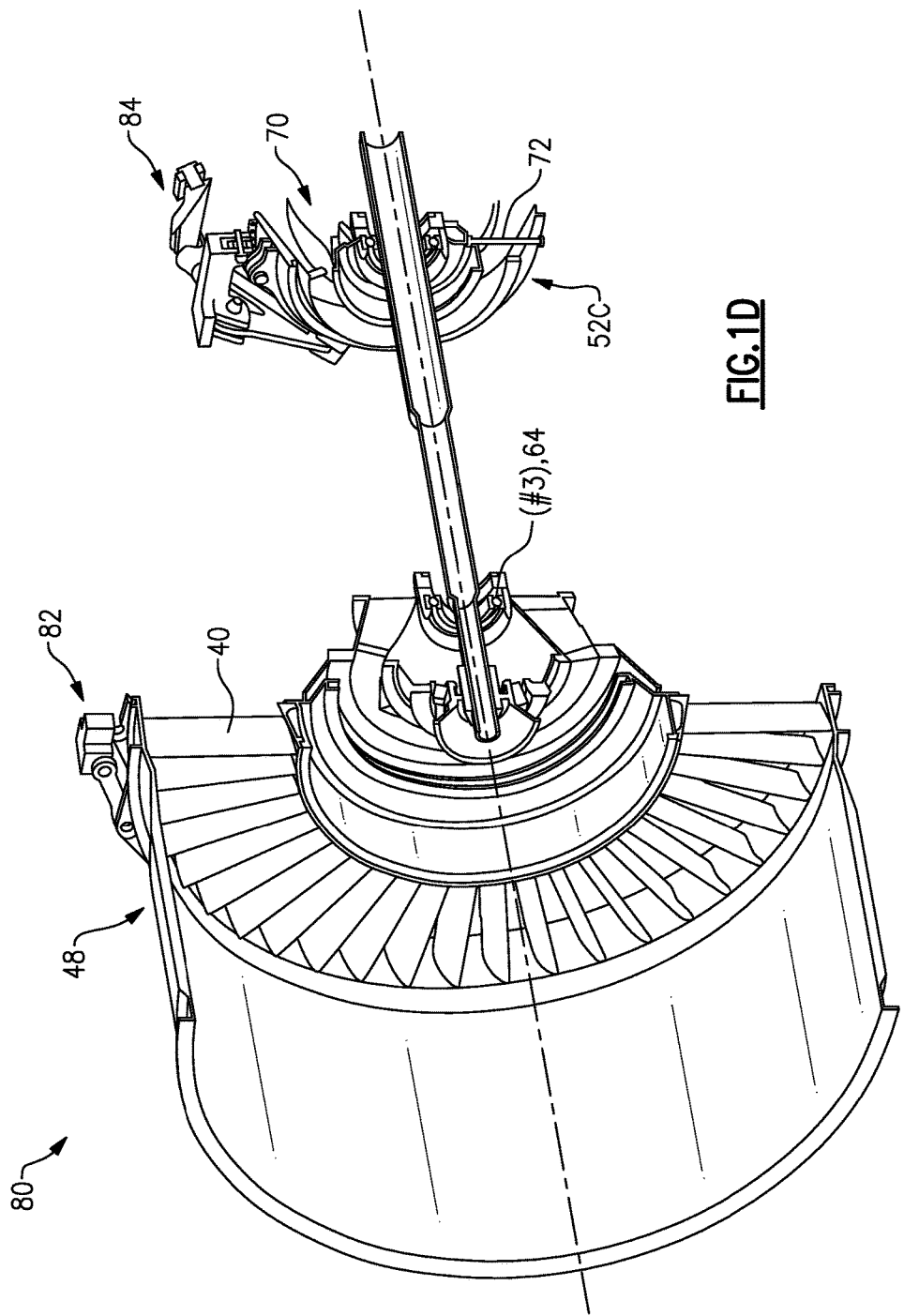
FIG. 1D is a forward perspective view of an mount system illustrating a rear mount attached through an engine thrust case to a mid-turbine frame between a first and second bearing supported thereby.

The #4 bearing 66 and the #5 bearing 68 are supported within a mid-turbine frame (MTF) 70 to straddle radially extending structural struts 72 which are preloaded in tension (FIGS. 1C-1D). The MTF 70 provides aft structural support within the thrust case 52C for the #4 bearing 66 and the #5 bearing 68 which rotatably support the spools 14, 24.

A dual rotor engine such as that disclosed in the illustrated embodiment typically includes a forward frame and a rear frame that support the main rotor bearings. The intermediate case (IMC) 48 also includes the radially extending struts 40 which are generally radially aligned with the #2 LPC bearing 62 (FIG. 1B). It should be understood that various engines with various case and frame structures will benefit from the present invention.

Figure 2A:
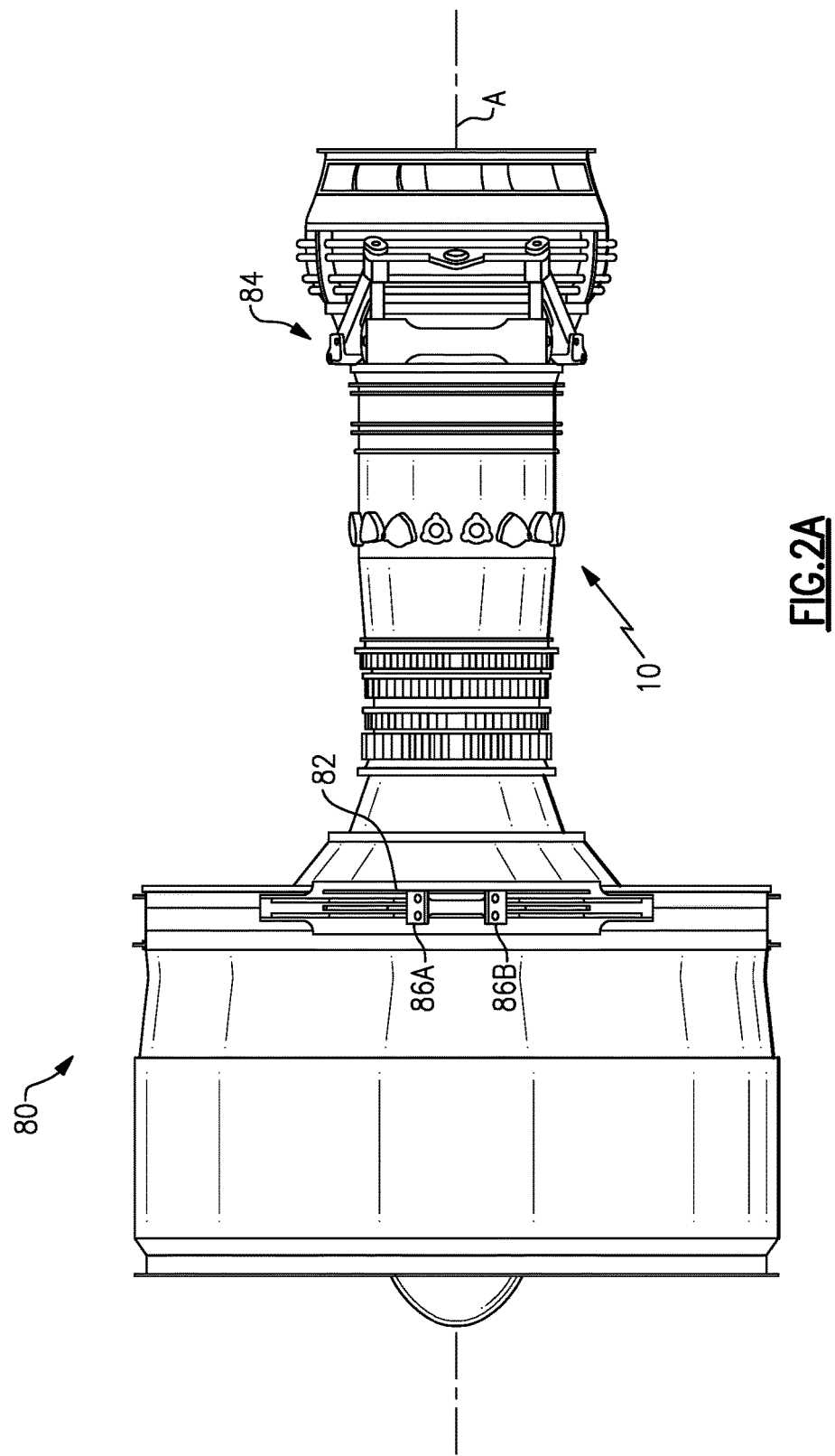
FIG. 2A is a top view of an engine mount system.

The turbofan gas turbine engine 10 is mounted to aircraft structure such as an aircraft wing through a mount system 80 attachable by the pylon 12. The mount system 80 includes a forward mount 82 and an aft mount 84 (FIG. 2A). The forward mount 82 is secured to the IMC 48 and the aft mount 84 is secured to the MTF 70 at the thrust case 52C. The forward mount 82 and the aft mount 84 are arranged in a plane containing the axis A of the turbofan gas turbine 10. This eliminates the thrust links from the intermediate case, which frees up valuable space beneath the core nacelle and minimizes IMC 48 distortion.

Figure 2C:
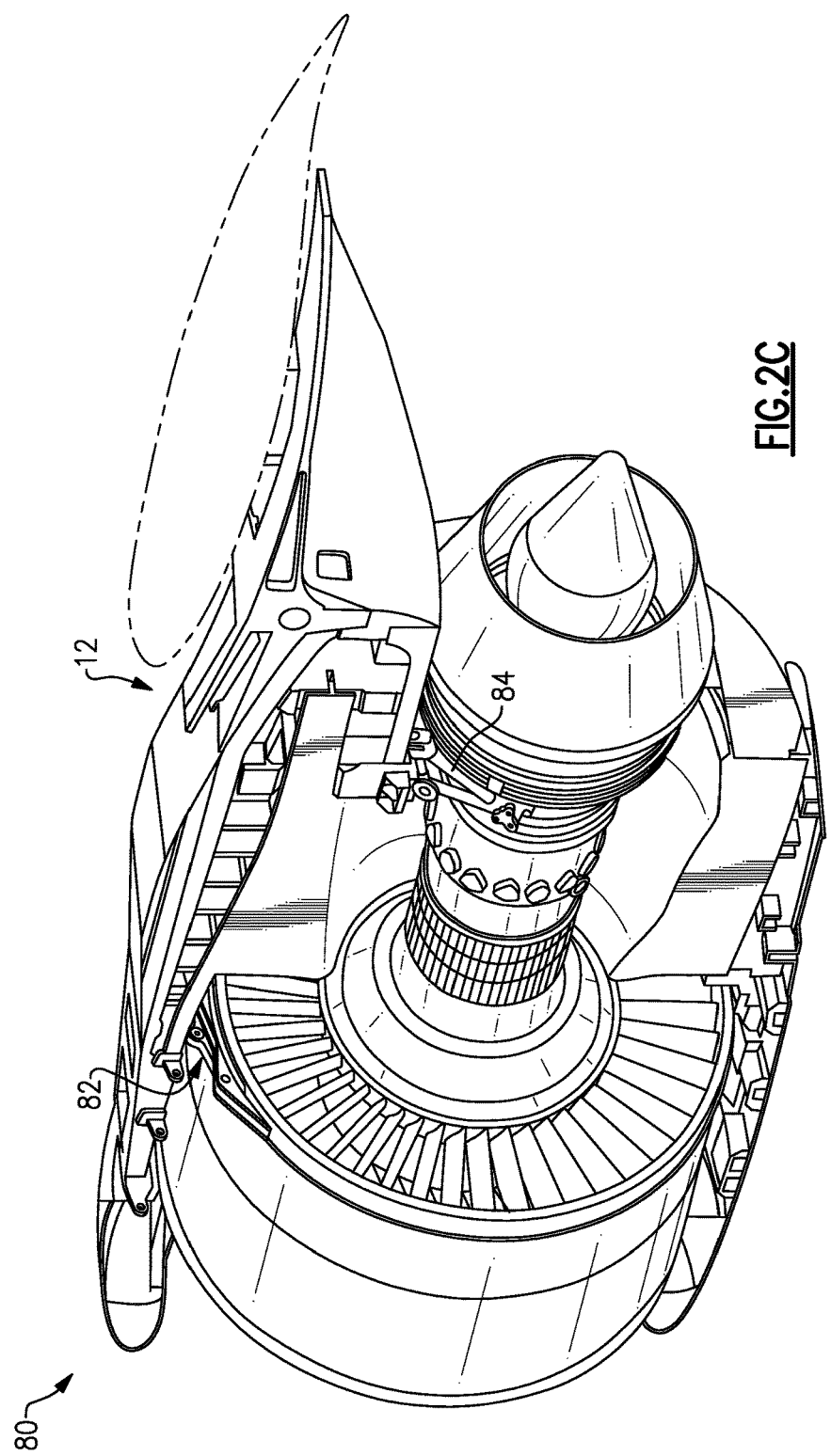
FIG. 2C is a forward perspective view of an engine mount system within a nacelle system.

Referring to FIGS. 2A-2C, the mount system 80 reacts the engine thrust at the aft end of the engine 10. The term "reacts" as utilized in this disclosure is defined as absorbing a load and dissipating the load to another location of the gas turbine engine 10.

Figure 3:
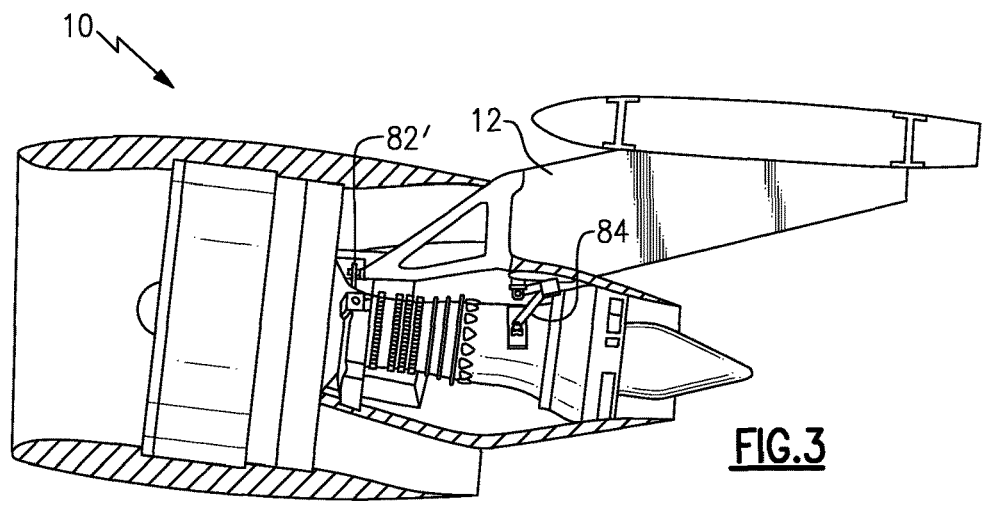
FIG. 3 is a side view of an engine mount system within another front mount.

The forward mount 82 supports vertical loads and side loads. The forward mount 82 in one non-limiting embodiment includes a shackle arrangement which mounts to the IMC 48 at two points 86A, 86B. The forward mount 82 is generally a plate-like member which is oriented transverse to the plane which contains engine axis A. Fasteners are oriented through the forward mount 82 to engage the intermediate case (IMC) 48 generally parallel to the engine axis A. In this illustrated non-limiting embodiment, the forward mount 82 is secured to the IMC 48. In another non-limiting embodiment, the forward mount 82 is secured to a portion of the core engine, such as the high-pressure compressor case 50 of the gas turbine engine 10 (see FIG. 3). One of ordinary skill in the art having the benefit of this disclosure would be able to select an appropriate mounting location for the forward mount 82.

Figure 4A:
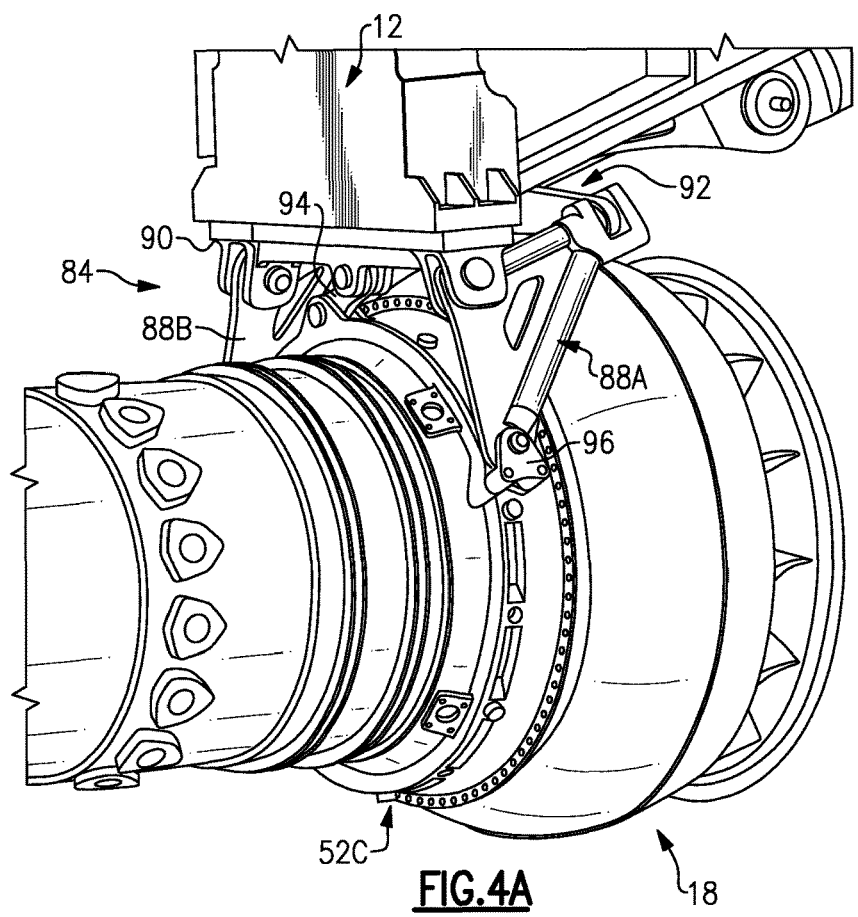
FIG. 4A is an aft perspective view of an aft mount.

Referring to FIG. 4A, the aft mount 84 generally includes a first A-arm 88A, a second A-arm 88B, a rear mount platform 90, a whiffle tree assembly 92 and a drag link 94. The rear mount platform 90 is attached directly to aircraft structure such as the pylon 12. The first A-arm 88A and the second A-arm 88B mount between the thrust case 52C at case bosses 96 which interact with the MTF 70 (FIGS. 4B-4C), the rear mount platform 90 and the whiffle tree assembly 92. It should be understood that the first A-arm 88A and the second A-arm 88B may alternatively mount to other areas of the engine 10 such as the high pressure turbine case or other cases. It should also be understood that other frame arrangements may alternatively be used with any engine case arrangement.

Figure 4B:
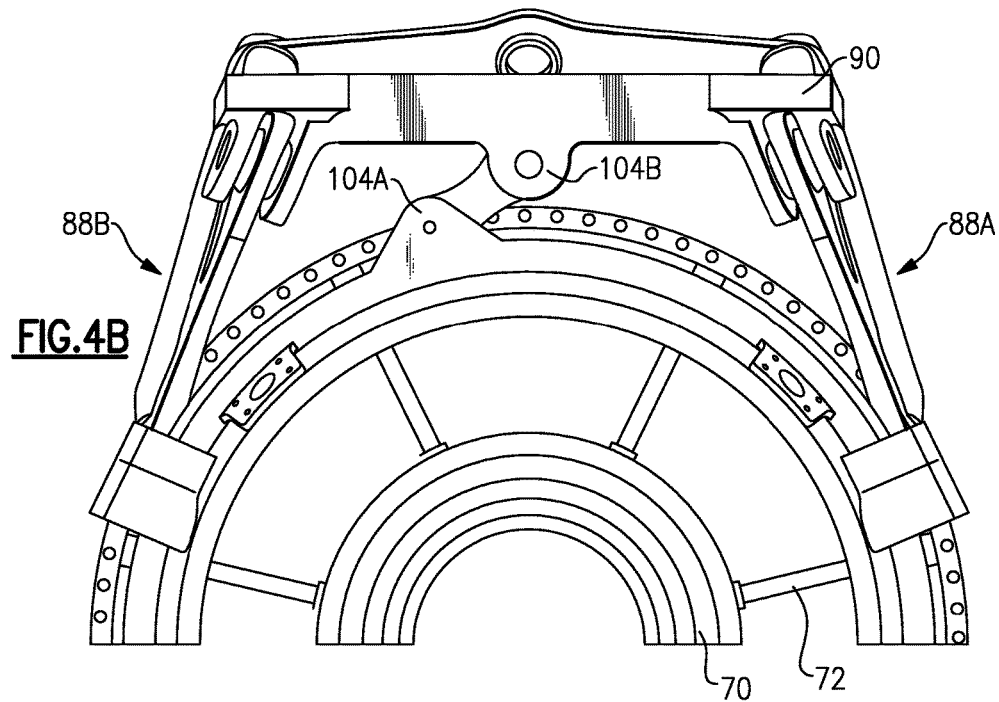
FIG. 4B is an aft view of an aft mount of FIG. 4A.
Figure 4C:
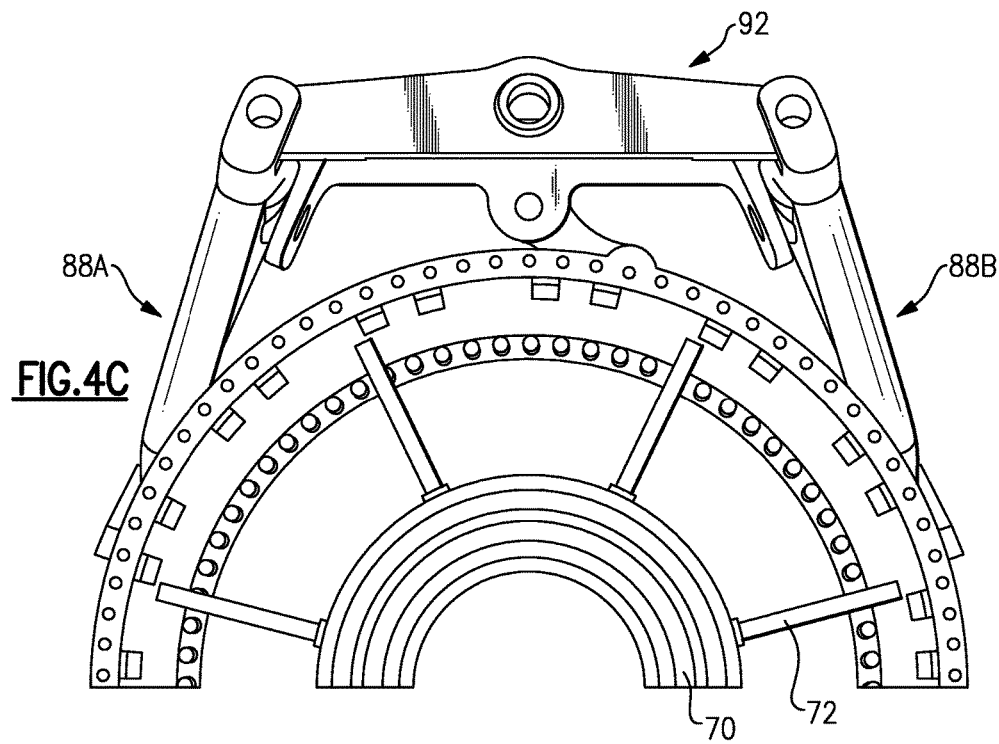
FIG. 4C is a front view of the aft mount of FIG. 4A.
Figure 4D:
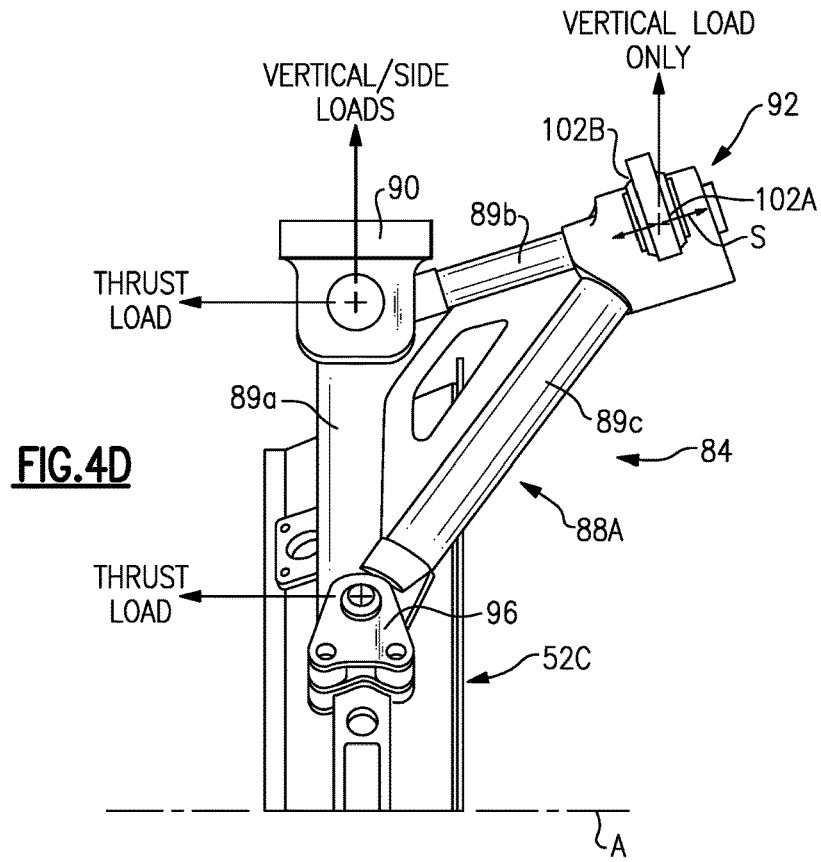
FIG. 4D is a side view of the aft mount of FIG. 4A.

Referring to FIG. 4D, the first A-arm 88A and the second A-arm 88B are rigid generally triangular arrangements, each having a first link arm 89$a$, a second link arm 89$b$ and a third link arm 89$c$. The first link arm 89$a$ is between the case boss 96 and the rear mount platform 90. The second link arm 89$b$ is between the case bosses 96 and the whiffle tree assembly 92. The third link arm 89$c$ is between the whiffle tree assembly 92 rear mount platform 90. The first A-arm 88A and the second A-arm 88B primarily support the vertical weight load of the engine 10 and transmit thrust loads from the engine to the rear mount platform 90.

The first A-arm 88A and the second A-arm 88B of the aft mount 84 force the resultant thrust vector at the engine casing to be reacted along the engine axis A which minimizes tip clearance losses due to engine loading at the aft mount 84. This minimizes blade tip clearance requirements and thereby improves engine performance.

Figure 4E:
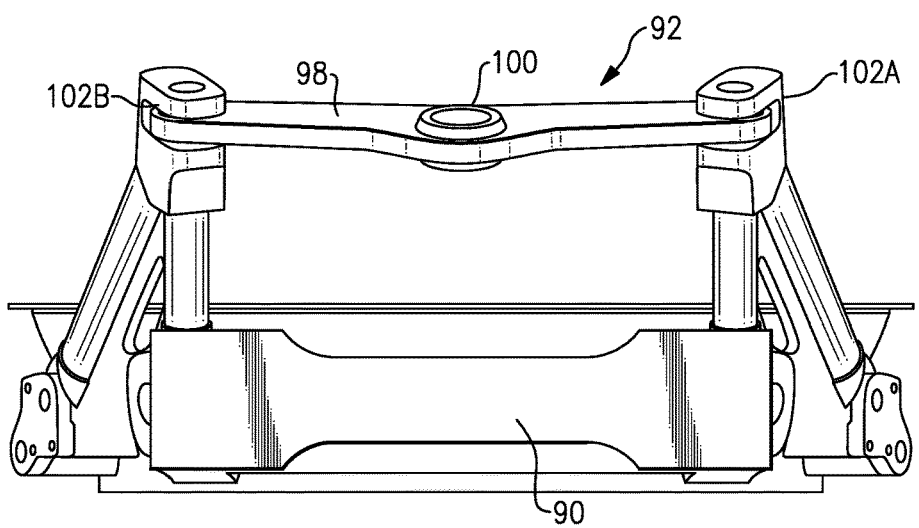
FIG. 4E is a top view of the aft mount of FIG. 4A.

The whiffle tree assembly 92 includes a whiffle link 98 which supports a central ball joint 100, a first sliding ball joint 102A and a second sliding ball joint 102B (FIG. 4E). It should be understood that various bushings, vibration isolators and such like may additionally be utilized herewith. The central ball joint 100 is attached directly to aircraft structure such as the pylon 12. The first sliding ball joint 102A is attached to the first A-arm 88A and the second sliding ball joint 102B is mounted to the first A-arm 88A.

The first and second sliding ball joint 102A, 102B permit sliding movement of the first and second A-arm 88A, 88B (illustrated by arrow S in FIGS. 5A and 5B) to assure that only a vertical load is reacted by the whiffle tree assembly 92. That is, the whiffle tree assembly 92 allows all engine thrust loads to be equalized transmitted to the engine pylon 12 through the rear mount platform 90 by the sliding movement and equalize the thrust load that results from the dual thrust link configuration. The whiffle link 98 operates as an equalizing link for vertical loads due to the first sliding ball joint 102A and the second sliding ball joint 102B. As the whiffle link 98 rotates about the central ball joint 100 thrust forces are equalized in the axial direction. The whiffle tree assembly 92 experiences loading only due to vertical loads, and is thus less susceptible to failure than conventional thrust-loaded designs.

The drag link 94 includes a ball joint 104A mounted to the thrust case 52C and ball joint 104B mounted to the rear mount platform 90 (FIGS. 4B-4C). The drag link 94 operates to react torque.

The aft mount 84 transmits engine loads directly to the thrust case 52C and the MTF 70. Thrust, vertical, side, and torque loads are transmitted directly from the MTF 70 which reduces the number of structural members as compared to current in-practice designs.

The mount system 80 is compact, and occupies space within the core nacelle volume as compared to turbine exhaust case-mounted configurations, which occupy space outside of the core nacelle which may require additional or relatively larger aerodynamic fairings and increase aerodynamic drag and fuel consumption. The mount system 80 eliminates the heretofore required thrust links from the IMC, which frees up valuable space adjacent the IMC 48 and the high pressure compressor case 50 within the core nacelle C.

It should be understood that relative positional terms such as "forward," "aft," "upper," "lower," "above," "below," and the like are with reference to the normal operational attitude of the vehicle and should not be considered otherwise limiting.

FIG. 6 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

FIG. 7 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A gas turbine engine comprising:
   a fan section including a fan rotor;
   a planetary gear train defined about an engine axis of rotation and having a gear reduction ratio of greater than 2.5:1;
   a first nacelle which at least partially surrounds a second nacelle and the fan rotor, the first nacelle having a first exit, the second nacelle having a second exit at an axial location aft of the first exit along the engine axis of rotation, and the fan section communicates airflow into the first nacelle and the second nacelle and provides an engine bypass ratio greater than 10:1;
   a four stage low pressure turbine, and a high pressure turbine with two high pressure turbine stages, the high pressure turbine followed by the low pressure turbine, and the low pressure turbine having a pressure ratio greater than 5:1 and driving the fan rotor through the gear train; and
   a static structure comprising a plurality of cases, wherein a first case of the plurality of cases includes a first engine mount location, and a second case of the plurality of cases is positioned aft of the first case, and wherein the second case includes a second engine mount location to react an engine thrust in operation, the second engine mount location not connected to said first case by a thrust link when the engine is mounted, and wherein the first engine mount location is axially near the gear train; and
   wherein the static structure supports a bearing system upon which the low pressure turbine, high pressure turbine and fan rotor rotate.

2. The gas turbine engine as recited in claim 1, further comprising a low fan pressure ratio less than 1.45 across a fan blade alone.

3. The gas turbine engine as recited in claim 2, wherein the fan section has a low corrected fan tip speed less than 1150 ft/second.

4. The gas turbine engine as recited in claim 3, further comprising a low pressure compressor, and a low spool including the low pressure compressor and the low pressure turbine, the low spool driving the fan section which is connected to the low spool through the gear train.

5. A gas turbine engine comprising:
   a fan section including a fan rotor;
   a planetary gear train defined about an engine axis of rotation and having a gear reduction ratio of greater than 2.5:1;
   a first nacelle which at least partially surrounds a second nacelle and the fan rotor, the first nacelle having a first exit, the second nacelle having a second exit axially aft of the first exit, and the fan section communicates airflow into the first nacelle and the second nacelle and provides an engine bypass ratio greater than 10:1;
   a four stage first turbine, and a second turbine with two second turbine stages, the second turbine followed by the first turbine, and the first turbine driving the fan rotor through the gear train; and
   a static structure comprising a first case located forward of a second case, the first case having a first engine mount location and the second case having a second engine mount location, each of the first engine mount location and second engine mount location supporting an engine mount when the engine is mounted, wherein the first engine mount location is axially near the gear train.

6. The gas turbine engine as recited in claim 5, further comprising a first compressor in communication with a second compressor, which is in communication with a combustor, and wherein the first compressor is a two or four stage compressor.

7. The gas turbine engine as recited in claim 6, wherein the first compressor is a four stage compressor.

8. The gas turbine engine as recited in claim 7, wherein the first exit of the first nacelle has an area, and the area is not variable.

9. The gas turbine engine as recited in claim 5, wherein the second engine mount location is not connected by a thrust link to said first case when the engine is mounted.

10. The gas turbine engine as recited in claim 9, wherein neither the first case nor the second case is a fan case.

11. The gas turbine engine as recited in claim 5, wherein the fan section has a low corrected fan tip speed less than 1150 ft/second, and further comprising a low fan pressure ratio less than 1.45 across a fan blade alone.

12. The gas turbine engine as recited in claim 11, wherein the first turbine has a pressure ratio greater than 5:1.

13. The gas turbine engine as recited in claim 12, further comprising a first compressor in communication with a second compressor, which is in communication with a combustor, and wherein the first compressor is a two or four stage compressor.

14. A gas turbine engine comprising:
a fan section including a fan rotor;
an epicyclic gear train defined about an engine axis of rotation and having a gear reduction ratio of greater than 2.5:1;
a first nacelle which at least partially surrounds a second nacelle and the fan rotor, the first nacelle having a first exit, the second nacelle having a second exit axially aft of the first exit, and the fan section communicates airflow into the first nacelle and the second nacelle and provides an engine bypass ratio greater than 10:1;
a high pressure compressor;
a high pressure turbine;
a combustor arranged between the high pressure compressor and the high pressure turbine, and said combustor produces combustor products;
a three or four stage low pressure turbine, the low pressure turbine receives combustor products after the high pressure turbine, has a pressure ratio greater than 5:1, and drives the fan rotor through the gear train; and
a static structure comprising a first static structure component located forward of a second static structure component, the first static structure component having a first engine mount location and the second static structure component having a second engine mount location, each of the first engine mount location and second engine mount location supporting an engine mount when the engine is mounted, wherein the first static structure component at least partially surrounds the gear train.

15. The gas turbine engine as recited in claim 14, wherein the high pressure turbine is a two stage turbine.

16. The gas turbine engine as recited in claim 14, wherein the fan section includes a plurality of fan blades, the fan blades having a design angle of incidence, and further comprising:
a fan variable area nozzle axially movable relative to the first nacelle to vary a fan nozzle exit area;
a controller that controls the fan variable area nozzle to vary the fan nozzle exit area to reduce a fan instability, and to maintain an angle of incidence of the fan blades close to the design angle of incidence at a plurality of flight conditions; and
wherein the controller reduces the fan nozzle exit area at a cruise flight condition.

17. The gas turbine engine as recited in claim 14, wherein the second engine mount location is not connected to said first static structure component by a thrust link when the engine is mounted.

18. The gas turbine engine as recited in claim 17, wherein the first static structure component is an intermediate case and the second static structure component is a mid-turbine frame.

19. The gas turbine engine as recited in claim 14, further comprising a low fan pressure ratio less than 1.45 across a fan blade alone.

20. The gas turbine engine as recited in claim 19, wherein the fan section has a low corrected fan tip speed less than 1150 ft/second.

21. The gas turbine engine as recited in claim 20, wherein the fan section includes a plurality of fan blades, the fan blades having a design angle of incidence, further comprising:
a fan variable area nozzle axially movable relative to the first nacelle to vary a fan nozzle exit area;
a controller that controls the fan variable area nozzle to vary the fan nozzle exit area to reduce a fan instability, and to maintain an angle of incidence of the fan blades close to the design angle of incidence at a plurality of flight conditions;
wherein the controller reduces the fan nozzle exit area at a cruise flight condition; and
wherein the fan section includes a plurality of fan blades with a fixed stagger angle.

22. The gas turbine engine as recited in claim 19, further comprising a two or four stage low pressure compressor.

23. The gas turbine engine as recited in claim 19, wherein the low pressure turbine is a four stage turbine.

24. The gas turbine engine as recited in claim 19, wherein the first engine mount location is axially near the gear train.

25. The gas turbine engine as recited in claim 24, wherein the second engine mount location reacts an engine thrust in operation, and the second engine mount locatin is not connected to said first static structure component by a thrust link when the engine is mounted.

* * * * *